United States Patent
Endo et al.

(10) Patent No.: US 10,319,998 B2
(45) Date of Patent: Jun. 11, 2019

(54) POSITIVE ACTIVE MATERIAL FOR LITHIUM SECONDARY BATTERY, METHOD FOR PRODUCING THE SAME, ELECTRODE FOR LITHIUM SECONDARY BATTERY, LITHIUM SECONDARY BATTERY AND ENERGY STORAGE APPARATUS

(71) Applicant: GS Yuasa International Ltd., Kyoto-shi, Kyoto (JP)

(72) Inventors: Daisuke Endo, Kyoto (JP); Hiromasa Muramatsu, Kyoto (JP)

(73) Assignee: GS Yuasa International, Kyoto (JP)

( * ) Notice: Subject to any disclaimer, the term of this patent is extended or adjusted under 35 U.S.C. 154(b) by 535 days.

(21) Appl. No.: 15/026,429

(22) PCT Filed: Oct. 1, 2014

(86) PCT No.: PCT/JP2014/005011
§ 371 (c)(1),
(2) Date: Mar. 31, 2016

(87) PCT Pub. No.: WO2015/049862
PCT Pub. Date: Apr. 9, 2015

(65) Prior Publication Data
US 2016/0240846 A1  Aug. 18, 2016

(30) Foreign Application Priority Data

Oct. 3, 2013  (JP) .................................. 2013-208370
Sep. 26, 2014  (JP) .................................. 2014-196484

(51) Int. Cl.
*H01M 4/485* (2010.01)
*H01M 4/131* (2010.01)
(Continued)

(52) U.S. Cl.
CPC .......... *H01M 4/485* (2013.01); *C01G 53/006* (2013.01); *C01G 53/50* (2013.01); *H01M 4/131* (2013.01);
(Continued)

(58) Field of Classification Search
CPC ..................................................... H01M 4/485
See application file for complete search history.

(56) References Cited

U.S. PATENT DOCUMENTS 6,040,090 A  3/2000  Nishio
8,382,860 B2  2/2013  Katayama
(Continued)

FOREIGN PATENT DOCUMENTS

CN  101478044 A  7/2009
CN  101679074 A  3/2010
(Continued)

OTHER PUBLICATIONS

Extended European Search Report dated Jul. 17, 2017 issued in the corresponding European patent application No. 14851084.5.
(Continued)

*Primary Examiner* — Sarah A. Slifka
*Assistant Examiner* — Brian R Ohara
(74) *Attorney, Agent, or Firm* — Rankin, Hill & Clark LLP (57) ABSTRACT

A positive active material for a lithium secondary battery containing a lithium transition metal composite oxide having a hexagonal crystal structure in which the transition metal (Me) includes Ni, Co and Mn, wherein in the lithium transition metal composite oxide, a molar ratio of Ni to the transition metal (Me) (Ni/Me) is 0.5 or more and 0.9 or less, a molar ratio of Co to the transition metal (Me) (Co/Me) is 0.1 or more and 0.3 or less, a molar ratio of Mn to the transition metal (Me) (Mn/Me) is 0.03 or more and 0.3 or
(Continued)

less, and a value obtained by dividing a half width ratio $F(003)/F(104)$ at a potential of 4.3 V (vs. Li/Li$^+$) by a half width ratio $F(003)/F(104)$ at a potential of 2.0 V (vs. Li/Li$^+$) is 0.9 or more and 1.1 or less.

8 Claims, 3 Drawing Sheets

(51) Int. Cl.
   *H01M 4/505* (2010.01)
   *H01M 4/525* (2010.01)
   *H01M 10/0525* (2010.01)
   *H01M 4/02* (2006.01)
   *C01G 53/00* (2006.01)

(52) U.S. Cl.
   CPC ........... *H01M 4/505* (2013.01); *H01M 4/525* (2013.01); *H01M 10/0525* (2013.01); *C01P 2002/72* (2013.01); *C01P 2002/74* (2013.01); *C01P 2004/61* (2013.01); *C01P 2006/11* (2013.01); *C01P 2006/40* (2013.01); *H01M 2004/028* (2013.01)

(56) References Cited

U.S. PATENT DOCUMENTS

| | | | |
|---|---|---|---|
| 8,551,659 | B2 | 10/2013 | Katayama |
| 9,219,275 | B2 | 12/2015 | Endo |
| 2003/0027047 | A1* | 2/2003 | Suita .................... H01M 4/505 429/224 |
| 2005/0142444 | A1* | 6/2005 | Nagashima ........... H01M 4/131 429/231.1 |
| 2006/0216600 | A1* | 9/2006 | Inagaki ................. H01M 2/06 429/231.1 |
| 2010/0233542 | A1* | 9/2010 | Endo .................... H01M 4/0445 429/223 |
| 2013/0313471 | A1 | 11/2013 | Murai |
| 2014/0058598 | A1 | 2/2014 | Ishii |
| 2014/0059845 | A1 | 3/2014 | Katayama |
| 2014/0205901 | A1 | 7/2014 | Nagai |
| 2014/0308584 | A1 | 10/2014 | Endo |

FOREIGN PATENT DOCUMENTS

| | | |
|---|---|---|
| CN | 101803073 A | 8/2010 |
| CN | 102110808 A | 6/2011 |
| CN | 103119761 A | 5/2013 |
| CN | 103283066 A | 9/2013 |
| EP | 1372202 A1 | 12/2003 |
| EP | 1391950 A1 | 2/2004 |
| EP | 2128915 A1 | 12/2009 |
| EP | 2144314 A2 | 1/2010 |
| EP | 2492243 A1 | 8/2012 |
| JP | 11025957 A2 | 1/1999 |
| JP | 2000195514 A2 | 7/2000 |
| JP | 2005053764 A2 | 3/2005 |
| JP | 2008293988 A2 | 12/2008 |
| JP | 2009059710 A2 | 3/2009 |
| JP | 2010086690 A2 | 4/2010 |
| JP | 2013051172 A2 | 3/2013 |
| JP | 2014060143 A2 | 4/2014 |
| WO | 2011065423 A1 | 6/2011 |
| WO | 2012091015 A1 | 7/2012 |
| WO | 2013069454 A1 | 5/2013 |
| WO | 2013121654 A1 | 8/2013 |

OTHER PUBLICATIONS

International Search Report dated Jan. 6, 2015 filed in PCT/JP2014/005011.

* cited by examiner

POSITIVE ACTIVE MATERIAL FOR LITHIUM SECONDARY BATTERY, METHOD FOR PRODUCING THE SAME, ELECTRODE FOR LITHIUM SECONDARY BATTERY, LITHIUM SECONDARY BATTERY AND ENERGY STORAGE APPARATUS

TECHNICAL FIELD

The present invention relates to a positive active material for a lithium secondary battery, a method for producing the positive active material, an electrode for a lithium secondary battery containing the positive active material, and a lithium secondary battery and an energy storage apparatus respectively including the electrode.

BACKGROUND ART

Currently, nonaqueous electrolyte secondary batteries typified by lithium ion secondary batteries, particularly lithium secondary batteries, are widely mounted on portable terminals, and the like. For these nonaqueous electrolyte secondary batteries, mainly $LiCoO_2$ is used as a positive active material. However, the discharge capacity of $LiCoO_2$ is about 120 to 130 mAh/g.

As a material of a positive active material for a lithium secondary battery, a solid solution of $LiCoO_2$ and other compounds is known. $Li[Co_{1-2x}Ni_xMn_x]O_2$ (0<x≤1/2), a solid solution having an $\alpha$-$NaFeO_2$ type crystal structure and formed of three components: $LiCoO_2$, $LiNiO_2$ and $LiMnO_2$, has been published in 2001. $LiNi_{1/2}Mn_{1/2}O_2$ or $LiCo_{1/3}Ni_{1/3}Mn_{1/3}O_2$ that is one example of the aforementioned solid solution has a discharge capacity of 150 to 180 mAh/g, and is also excellent in terms of charge-discharge cycle performance.

In contrast with so called a "$LiMeO_2$-type" active material as described above, so called a "lithium-excess-type" active material is known in which the composition ratio Li/Me of lithium (Li) to the ratio of a transition metal (Me) is larger than 1, with Li/Me being, for example, 1.25 to 1.6 (see, for example, Patent Document 1 and Patent Document 2). This material can be represented by $Li_{1+\alpha}Me_{1-\alpha}O_2$ ($\alpha$>0). Here, $\beta=(1+\alpha)/(1-\alpha)$ when the composition ratio Li/Me of lithium (Li) to the ratio of a transition metal (Me) is $\beta$, and therefore, for example, $\alpha$=0.2 when Li/Me is 1.5.

Patent Document 1 describes on the active material "the intensity ratio of the diffraction peak of the (003) plane to the diffraction peak of the (104) plane in X-ray diffraction measurement is $I_{(003)}/I_{(104)} \geq 1.56$ before charge-discharge, and $I_{(003)}/I_{(104)} > 1$ at the end of discharge".

Further, the positive active material for a lithium secondary battery containing a lithium transition metal composite oxide in which the half widths of the diffraction peak of the (003) plane and the (104) plane in X-ray diffraction measurement are specified (see Patent Documents 3 to 5) are known.

Patent Document 3 describes "In a nonaqueous electrolyte secondary battery including a positive electrode containing a lithium-transition metal composite oxide as a positive electrode material, a negative electrode and nonaqueous electrolyte, wherein a compound which is a lithium-transition metal composite oxide including at least Ni, Co and Mn and in which a half width of the peak present in a range of 2θ=18.71±0.25°, measured by a powder X-ray diffraction measurement using CuKα as a radiation source is 0.22° or less, is used as the positive electrode material". As an object of the invention, "To provide a nonaqueous electrolyte secondary battery which has an initial discharge capacity improved by improving a positive electrode material and has excellent cycle performance by suppressing a reduction of discharge capacity in repeating charge-discharge" is described.

Patent Document 4 describes "A lithium-nickel-manganese-cobalt composite oxide of a layer structure having chemical composition of $Li_aNi_xMn_yCo_zO_{2+b}$ (x+y+z=1, 1.00<a<1.3, 0≤b<0.3) in which diffraction peak angles 2θ of a (003) plane and a (104) plane in the Miller index hkl of a powder X-ray diffraction using a CuKα radiation source are 18.65° or more and 44.50° or more, respectively and both of half widths of the diffraction peaks of these planes are 0.18° or less, and further diffraction peak angles 2θ of a (108) plane and a (110) plane are 64.40° and 65.15° or more, respectively and both of half widths of the diffraction peaks of these planes are 0.18° or less". As an object of the invention, "To provide a material for a positive active material which can impart a high discharge capacity, a high current load performance and high reliability (enhanced life) to the lithium ion secondary battery" is described.

Patent Document 5 describes "A lithium secondary battery including a current collector, and an active material layer containing an active material particle and held in the current collector, wherein the active material particle is a secondary particle formed by aggregating a plurality of primary particles of a lithium transition metal oxide, and constitutes a hollow structure having a hollow portion formed on the inner side of the secondary particle and a shell portion surrounding the hollow portion, and a through-hole penetrated from the outside to the hollow portion is formed in the secondary particle, and in a powder X-ray diffraction pattern of the active material particle, a ratio (A/B) of a half width A of a diffraction peak obtained by a (003) plane to a half width B of a diffraction peak obtained by a (104) plane satisfies the following formula: (A/B)≤0.7.". As an object of the invention, to provide a lithium secondary battery which can exert a required power even in a low SOC region, improve travelling performance of hybrid automobile and electric automobiles, and reduce the number of batteries for securing a required amount of energy" is described.

PRIOR ART DOCUMENTS

Patent Documents

Patent Document 1: JP-A-2010-86690
Patent Document 2: WO2012/091015
Patent Document 3: JP-A-11-25957
Patent Document 4: JP-A-2005-53764
Patent Document 5: JP-A-2013-51172

DISCLOSURE OF THE INVENTION

Problems to be Solved by the Invention

The discharge capacity of the aforementioned so-called "lithium-excess-type" active material is generally larger than that of the so-called "$LiMeO_2$-type" active material; however, it is difficult to solve an problem that high rate discharge performance at the end of discharge is low. In the present invention, it is investigated to further improve the "$LiMeO_2$-type" to satisfy a specification of the active material.

The present invention has been made in view of the above-mentioned problem, and it is an object of the present invention to provide a positive active material for a lithium secondary battery which has high energy density.

Means for Solving the Problems

In the present invention, the following configuration is employed in order to solve aforementioned object.

A positive active material for a lithium secondary battery contains a lithium transition metal composite oxide having a hexagonal crystal structure in which the transition metal (Me) includes Ni, Co and Mn. In the lithium transition metal composite oxide, a molar ratio of Ni to the transition metal (Me) (Ni/Me) is 0.5 or more and 0.9 or less, a molar ratio of Co to the transition metal (Me) (Co/Me) is 0.1 or more and 0.3 or less, a molar ratio of Mn to the transition metal (Me) (Mn/Me) is 0.03 or more and 0.3 or less, a value obtained by dividing a half width ratio F(003)/F(104) at a potential of 4.3 V (vs. Li/Li$^+$) by a half width ratio F(003)/F(104) at a potential of 2.0 V (vs. Li/Li+) is 0.9 or more and 1.1 or less.

Advantages of the Invention

According to the present invention, a positive active material for a lithium secondary battery having high energy density can be provided.

MODE FOR CARRYING OUT THE INVENTION

The discharge capacity of the aforementioned so-called "lithium-excess-type" active material is generally larger than that of the so-called "LiMeO$_2$-type" active material; however, it is difficult to solve a problem that high rate discharge performance at the end of discharge is low. In the present invention, it is investigated to further improve the "LiMeO$_2$-type" to satisfy a specification of the active material.

Further, in recent years, it is required of a lithium secondary battery used in the field of automobiles such as electric automobiles, hybrid automobiles and plug-in hybrid automobiles that not only a discharge capacity is high, but also a high power can be exhibited (energy density is high) by increasing a voltage since a power source is basically used for driving a motor and initial efficiency is high.

The present invention has been made in view of the above-mentioned problem, and it is an object of the present invention to provide a positive active material for a lithium secondary battery which has high energy density, or has high energy density and excellent initial efficiency, a method for producing the positive active material, and a lithium secondary battery using the positive active material.

In the present invention, the following configurations are employed in order to solve aforementioned problem.

(1) A positive active material for a lithium secondary battery containing a lithium transition metal composite oxide having a hexagonal crystal structure in which the transition metal (Me) includes Ni, Co and Mn, wherein in the lithium transition metal composite oxide, a molar ratio of Ni to the transition metal (Me) (Ni/Me) is 0.5 or more and 0.9 or less, a molar ratio of Co to the transition metal (Me) (Co/Me) is 0.1 or more and 0.3 or less, a molar ratio of Mn to the transition metal (Me) (Mn/Me) is 0.03 or more and 0.3 or less, and a value obtained by dividing a half width ratio F(003)/F(104) at a potential of 4.3 V (vs. Li/Li$^+$) by a half width ratio F(003)/F(104) at a potential of 2.0 V (vs. Li/Li$^+$) is 0.9 or more and 1.1 or less.

(2) The positive active material for a lithium secondary battery of the above (1), wherein the lithium transition metal composite oxide is represented by the composition formula Li$_{1+x}$(Ni$_a$Co$_b$Mn$_c$)$_{1-x}$O$_2$ (−0.1<x<0.1, 0.5≤a≤0.9, 0.1≤b≤0.3, 0.03≤c≤0.3, a+b+c=1).

(3) The positive active material for a lithium secondary battery of the above (1) or (2), wherein in the lithium transition metal composite oxide, a particle size distribution does not have two or more local maximal values.

(4) A method for producing a positive active material for a lithium secondary battery containing a lithium transition metal composite oxide having a hexagonal crystal structure in which the transition metal (Me) includes Ni, Co and Mn, wherein when coprecipitating compounds containing Ni, Co and Mn in a solution to prepare a precursor, a solution containing a compound of Ni and Co and a solution containing a Mn compound are simultaneously added dropwise separately, and thereby a precursor of a transition metal composite oxide in which a molar ratio of Ni to the transition metal (Me) is 0.5 or more and 0.9 or less, a molar ratio of Co to the transition metal (Me) is 0.1 or more and 0.3 or less, and a molar ratio of Mn to the transition metal (Me) is 0.03 or more and 0.3 or less, is prepared.

(5) The method for producing a positive active material for a lithium secondary battery of the above (4), wherein the precursor has a tap density of 1.4 g/cc or more.

(6) An electrode for a lithium secondary battery containing the positive active material for a lithium secondary battery of any one of the above (1) to (3).

(7) A lithium secondary battery including the electrode for a lithium secondary battery of the above (6).

(8) An energy storage apparatus configured by assembling a plurality of the lithium secondary batteries of the above (7).

According to (1) a first aspect and (2) a second aspect of the present invention, a positive active material for a lithium secondary battery having high energy density can be provided.

According to (3) a third aspect of the present invention, a positive active material for a lithium secondary battery having high energy density and excellent initial efficiency can be provided.

According to (4) a fourth aspect of the present invention, a method for producing a positive active material for a lithium secondary battery having high energy density can be provided.

According to (5) a third aspect of the present invention, a method for producing a positive active material for a lithium secondary battery having high energy density and excellent initial efficiency can be provided.

According to (6) a sixth to (8) eighth aspects of the present invention, it is possible to provide an electrode for a lithium secondary battery, a lithium secondary battery and an energy storage apparatus which have high energy density, or has high energy density and excellent initial efficiency.

A constitution and the functional effect of the present invention will be described including technological idea. Here, an operating mechanism includes presumption, and its right and wrong does not limit the present invention. Incidentally, the present invention may be embodied in other various forms without departing from the spirit and main features. Therefore, embodiments and examples described later are merely exemplifications in all respects and are not to be construed to limit the scope of the invention. Moreover, variations and modifications belonging to an equivalent scope of the claims are all within the scope of the invention.

As the composition of the lithium transition metal composite oxide contained in the active material for a lithium secondary battery according to the present invention, the composition of so-called "LiMeO$_2$ type" represented by the composition formula of Li$_{1+x}$Me$_{1-x}$O$_2$ (Me is a transition metal including Ni, Co and Mn) is employed from the viewpoint of attaining high energy density.

The lithium transition metal composite oxide according to the present invention may be represented by the composition formula, as an example, Li$_{1+x}$(Ni$_a$Co$_b$Mn$_c$)$_{1-x}$O$_2$ (a+b+c=1), and x preferably satisfies a relationship of −0.1<x<0.1 in order to obtain a lithium secondary battery having high energy density. As described later, x is determined according to the ratio of F(003)/F(104) at the end of charge to F(003)/F(104) at the end of discharge, and when the ratio is 0.9 or more and 1.1 or less, a relationship of −0.1<x<0.1 holds. It is preferred that x satisfies a relationship of −0.05≤x≤0.09.

In the present invention, in order to improve the energy density of the lithium secondary battery, a, a molar ratio of Ni to the transition metal element Me (Ni/Me) is 0.5 or more and 0.9 or less. The molar ratio is preferably 0.6 or more and 0.9 or less.

Further, in order to improve the energy density of the lithium secondary battery, b, a molar ratio of Co to the transition metal element Me (Co/Me) is 0.1 or more and 0.3 or less. The molar ratio is preferably 0.1 or more and 0.25 or less.

Similarly, in order to improve the energy density of the lithium secondary battery, c, a molar ratio of Mn to the transition metal element Me (Mn/Me) is 0.03 or more and 0.3 or less. The molar ratio is preferably 0.03 or more and 0.2 or less.

Further, it is not excluded that the lithium transition metal composite oxide contains a small amount of other metals such as alkali metals, for example, Na, K, etc., alkaline earth metals, for example, Mg, Ca, etc., or transition metals typified by 3d transition metal, for example, Fe, Zn, etc. to an extent not impairing the effect of the present invention.

The lithium transition metal composite oxide according to the present invention has a hexagonal crystal structure. The lithium transition metal composite oxide after synthesis (before performing charge-discharge) belongs to a space group R3-m. Incidentally, "R3-m" is basically to be noted by affixing a bar "-" above "3" of "R3m".

The lithium transition metal composite oxide according to the present invention is characterized in that when the space group R3-m is used for a crystal structure model based on an X-ray diffraction (a CuKα radiation source was used) pattern, a ratio of a half width F(003) of the diffraction peak (diffraction peak of 2θ=18.6°±1° belonging to a (003) plane to a half width F(104) of the diffraction peak (diffraction peak of 2θ=44°±1° belonging to a (104) plane does not vary greatly between in 4.3 V (vs. Li/Li$^+$) charge and in 2.0 V (vs. Li/Li$^+$) discharge, that is, a value obtained by dividing a half width ratio F(003)/F(104) at a potential of 4.3 V (vs. Li/Li$^+$) by a half width ratio F(003)/F(104) at a potential of 2.0 V (vs. Li/Li$^+$) (hereinafter, also referred to as a "ratio of F(003)/F(104) at the end of charge to F(003)/F(104) at the end of discharge") is 0.9 or more and 1.1 or less. By using, as a positive active material, a lithium transition metal composite oxide in which the value is 0.9 or more and 1.1 or less, the lithium secondary battery having high energy density is attained.

In the lithium transition metal composite oxide, it is preferred to set the F(003) in a range of 0.15° to 0.35°, and it is preferred to set the F(104) in a range of 0.15° to 0.40°.

The reason why the energy density of a lithium secondary battery is improved when the half width ratio of the lithium transition metal composite oxide according to the present invention is set in a specific range is guessed as follows.

Crystallographically, the F(003) is a parameter of crystallinity along a c-axis direction, and it indicates that the larger the F(003) is, the larger a lattice distortion in the c-axis direction is. Meanwhile, the F(104) is a parameter showing stereoscopic crystallinity, and it indicates that the larger the F(104) is, the larger a lattice distortion of the whole crystal is. Therefore, F(003)/F(104) becomes an index showing an anisotropic strain of a crystal that how the lattice is distorted in the c-axis direction to the crystallinity in the whole crystal. Therefore, the ratio of F(003)/F(104) in a state of the end of charge to F(003)/F(104) in a state of the end of discharge represents a degree of the change in anisotropic strain of a crystal during the charge-discharge process.

In Comparative Example 1 described later, a production condition in which Ni, Co and Mn are uniformly distributed in a particle is used, and the ratio of F(003)/F(104) in a state of the end of charge to F(003)/F(104) in a state of the end of discharge (degree of change in strain) is decreased (less than 0.9). Meanwhile, in Comparative Example 3, a production condition in which Ni, Co and Mn are non-uniformly distributed in a particle (solid phase method) is used, and the ratio of F(003)/F(104) in a state of the end of charge to F(003)/F(104) in a state of the end of discharge (degree of change in strain) is increased (more than 1.1). Further, in the production conditions of Comparative Example 2, since Mn is non-uniformly present with respect to the distributions of Ni and Co, the composite oxide becomes a state in which compounds different in element ratio, and thus different in lattice constant, coexist. It is guessed that this causes the difference in the degree of change in strain from Comparative 1.

In contrast with this, in Examples of the present invention described later, since a degree of non-uniformity of Mn in a particle is between Comparative Example 1 and Comparative Example 3, the ratio of F(003)/F(104) in a state of the end of charge to F(003)/F(104) in a state of the end of discharge (degree of change in strain) assumes a value intermediate between the Comparative Example 1 and Comparative Example 3 (0.9 to 1.1). Accordingly, it is said that in the present example, a production amount of the Mn compound which is fine and non-uniformly present in the particle is controlled. That is, the present inventors guess that the present invention is a conventional compound in which Ni, Co and Mn are uniformly present as a main phase and shows an excellent effect of improving energy density together with a Mn-based compound resulting from a $Li_2MnO_3$-base as a by-product or the like.

As described above, since the present invention is a conventional compound in which Ni, Co and Mn are uniformly present as a main phase, that is, a "$LiMeO_2$ type" compounds, it is represented by the composition formula of $Li_{1+x}Me_{1-x}O_2$ (Me is a transition metal including Ni, Co and Mn), and x is a numeric value close to 0 and preferably satisfies a relationship of $-0.1 < x < 0.1$. x is determined according to the ratio of F(003)/F(104) at the end of charge to F(003)/F(104) at the end of discharge, and when the ratio is 0.9 or more and 1.1 or less, a relationship of $-0.1 < x < 0.1$ holds. When the ratio of F(003)/F(104) is less than 0.9 as described in Comparative Example 5, x is −0.1 or less, and when the ratio is more than 1.1 as described in Comparative Example 6, x is 0.1 or more.

Further, the lithium transition metal composite oxide preferably does not change in a structure during overcharge. This can be confirmed by being observed as a single phase belonging to a space group R3-m on an X-ray diffraction chart when the lithium transition metal composite oxide is electrochemically oxidized up to a potential of 5.0 V (vs. $Li/Li^+$). Thereby, it is possible to obtain lithium secondary battery having excellent charge-discharge cycle performance.

Moreover, in the lithium transition metal composite oxide, an oxygen positional parameter which is determined by crystal structure analysis by a Rietveld method based on an X-ray diffraction pattern, is preferably 0.262 or less at the end of discharge and 0.267 or more at the end of charge. Thereby, it is possible to obtain lithium secondary battery having excellent high rate discharge performance. Incidentally, the oxygen positional parameter refers to a value of z at the time when with respect to a crystal structure of an $\alpha$-$NaFeO_2$ type of a lithium transition metal composite oxide belonging to a space group R3-m, a space coordinate of Me (transition metal) is defined as (0, 0, 0), a space coordinate of Li (lithium) is defined as (0, 0, 1/2), and a space coordinate of O (oxygen) is defined as (0, 0, z). That is, the oxygen positional parameter is a relative index indicating how far an O (oxygen) position is from a Me (transition metal) position (refer to Patent Document 2).

In the lithium transition metal composite oxide according to the present invention, it is preferred that a particle size distribution does not have two or more local maximal values. By using a lithium transition metal composite oxide in which a particle size distribution does not have two or more local maximal values as a positive active material, a lithium secondary battery having high energy density and excellent initial efficiency can be obtained.

A BET specific surface area of the positive active material according to the present invention is preferably 0.2 $m^2/g$ or more, and more preferably 0.3 $m^2/g$ or more and 1.5 $m^2/g$ or less in order to obtain a lithium secondary battery having excellent initial efficiency and excellent high rate discharge performance.

Further, a tap density is preferably 1.25 g/cc or more, and more preferably 1.7 g/cc or more in order to obtain a lithium secondary battery having excellent high rate discharge performance.

Next, a method for producing an active material for a lithium secondary battery of the present invention will be described.

The active material for a lithium secondary battery of the present invention can be basically obtained by preparing a raw material containing metal elements (Li, Ni, Co, Mn) for constituting an active material as the composition of the desired active material (oxide), and sintering the raw material. However, with respect to the amount of the Li raw material, it is preferable to charge the Li raw material in an excessive amount by about 1 to 5% in consideration of loss of a part thereof during sintering.

In preparing an oxide having desired composition, so called a "solid phase method" in which salts of Li, Ni, Co and Mn are mixed and sintered, and so called a "coprecipitation method" in which a coprecipitation precursor with Ni, Co and Mn existing in one particle is prepared in advance, and a Li salt is mixed thereto and the mixture is sintered, are known. In the synthesis process of the "solid phase method", particularly Mn is hard to be uniformly solid-solved in Ni and Co, and therefore it is difficult to obtain a sample in which the elements are uniformly distributed in one particle. In the past, in documents and so on, many attempts have been made to solid-solve Mn in a part of Ni or Co ($LiNi_{1-x}Mn_xO_2$, etc.) by the solid phase method, but by selecting the "coprecipitation method", a uniform phase is more easily obtained at an atomic level. Thus, in Examples described later, the "coprecipitation method" is employed.

In preparing the coprecipitated precursor, since Mn among Ni, Co and Mn is easily oxidized and it is not easy to prepare the coprecipitated precursor in which Ni, Co and Mn are uniformly distributed in a divalent state, uniform mixing of Ni, Co and Mn at an atomic level tends to become insufficient. In the present invention, it is preferred to remove dissolved oxygen in order to control a production amount of a Mn compound which is fine and non-uniformly present in the particle of the coprecipitated precursor. A method of removing dissolved oxygen includes a method of bubbling a gas not containing oxygen. The gas not containing oxygen is not particularly limited, and a nitrogen gas, an argon gas, or carbon dioxide ($CO_2$) can be used.

A pH in the step of coprecipitating compounds containing Ni, Co and Mn, respectively, in a solution to produce a precursor is not limited, and the pH can be 10.5 to 14 when a coprecipitated hydroxide precursor is prepared as the coprecipitated precursor. It is preferred to control a pH in order to increase the tap density. When the pH is adjusted to 11.5 or less, the tap density can be 1.00 $g/cm^3$ or more to improve the high rate discharge performance. Moreover, when the pH is adjusted to 11.0 or less, since a particle growing rate can be accelerated, a stirring duration time after completion of dropwise addition of an aqueous solution of a raw material can be shortened.

Further, the pH can be 7.5 to 11 when a coprecipitated carbonate precursor is prepared as the coprecipitated precursor. When the pH is adjusted to 9.4 or less, the tap density can be 1.25 g/cc or more to improve the high rate discharge performance. Moreover, when the pH is adjusted to 8.0 or less, since a particle growing rate can be accelerated, a stirring duration time after completion of dropwise addition of an aqueous solution of a raw material can be shortened.

In the present invention, it is preferred to employ a hydroxide as the coprecipitated precursor in order to make the inside of the positive active material compact, to reduce a particle size, and to prevent the active material from adhering to a roll during pressing an electrode. Further, by employing a crystallization reaction using a complexing agent or the like, a precursor with a higher bulk density can also be prepared. In this case, since an active material with a higher density can be obtained by mixing and sintering the precursor with a Li source, the energy density per electrode area can be improved.

In the present invention, it is characterized in that in order to control a production amount of a Mn compound which is fine and non-uniformly present in the particle of the coprecipitated precursor, a solution containing a compound of Ni and Co and a solution containing a Mn compound are simultaneously added dropwise separately in a step of coprecipitating compounds containing Ni, Co and Mn in a solution to prepare a precursor. It is preferred to employ a method in which two nozzles of a nozzle for dropwise addition of a Ni and Co-containing solution and a nozzle for dropwise addition of a Mn-containing solution are disposed to add dropwise the Ni and Co-containing solution and the Mn-containing solution simultaneously.

Further, the method of separately and simultaneously adding dropwise a solution containing a compound of Ni and Co and a solution containing a Mn compound is not limited to a method of separately adding dropwise a solution containing a compound of Ni and Co and not containing a Mn compound at all, and a solution containing only a Mn compound. A method of separately and simultaneously adding dropwise a solution containing a compound of Ni and Co and containing a Mn compound a little, and a solution containing a Mn compound can also be included. By such methods, it is also possible to control a production amount of a Mn compound which is fine and non-uniformly present in the particle of the coprecipitated precursor, and possible to produce a lithium transition metal composite oxide having a specific half width ratio of the present invention. Further, with respect to the term "simultaneous(ly)", some temporal error is tolerable within a range in which the lithium transition metal composite oxide having a specific half width ratio of the present invention can be produced.

Examples of the raw material of the coprecipitated precursor may include nickel hydroxide, nickel carbonate, nickel sulfate, nickel nitrate and nickel acetate for the Ni compound; cobalt sulfate, cobalt nitrate and cobalt acetate for the Co compound; and manganese oxide, manganese carbonate, manganese sulfate, manganese nitrate and manganese acetate for the Mn compound.

A rate of dropwise addition of the aqueous solution of a raw material has a large effect on the uniformity of element distribution in a particle of the coprecipitated precursor to be produced. A preferred rate of dropwise addition is affected by a size of the reaction tank, stirring conditions, a pH, and a reaction temperature, and the rate of dropwise addition is preferably 30 ml/min or less. For increasing the discharge capacity, the rate of dropwise addition is more preferably 10 ml/min or less, and most preferably 5 ml/min or less.

Figure 1A:
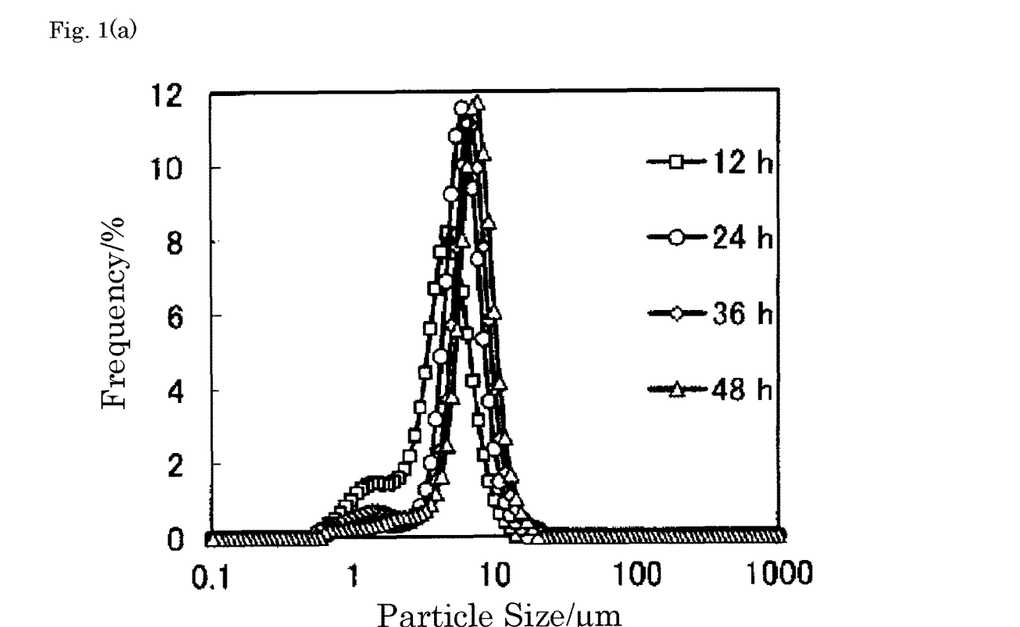
FIG. 1(a) is a view showing a particle size distribution for every dropwise addition time of a coprecipitated precursor.
Figures 2A, 2B:
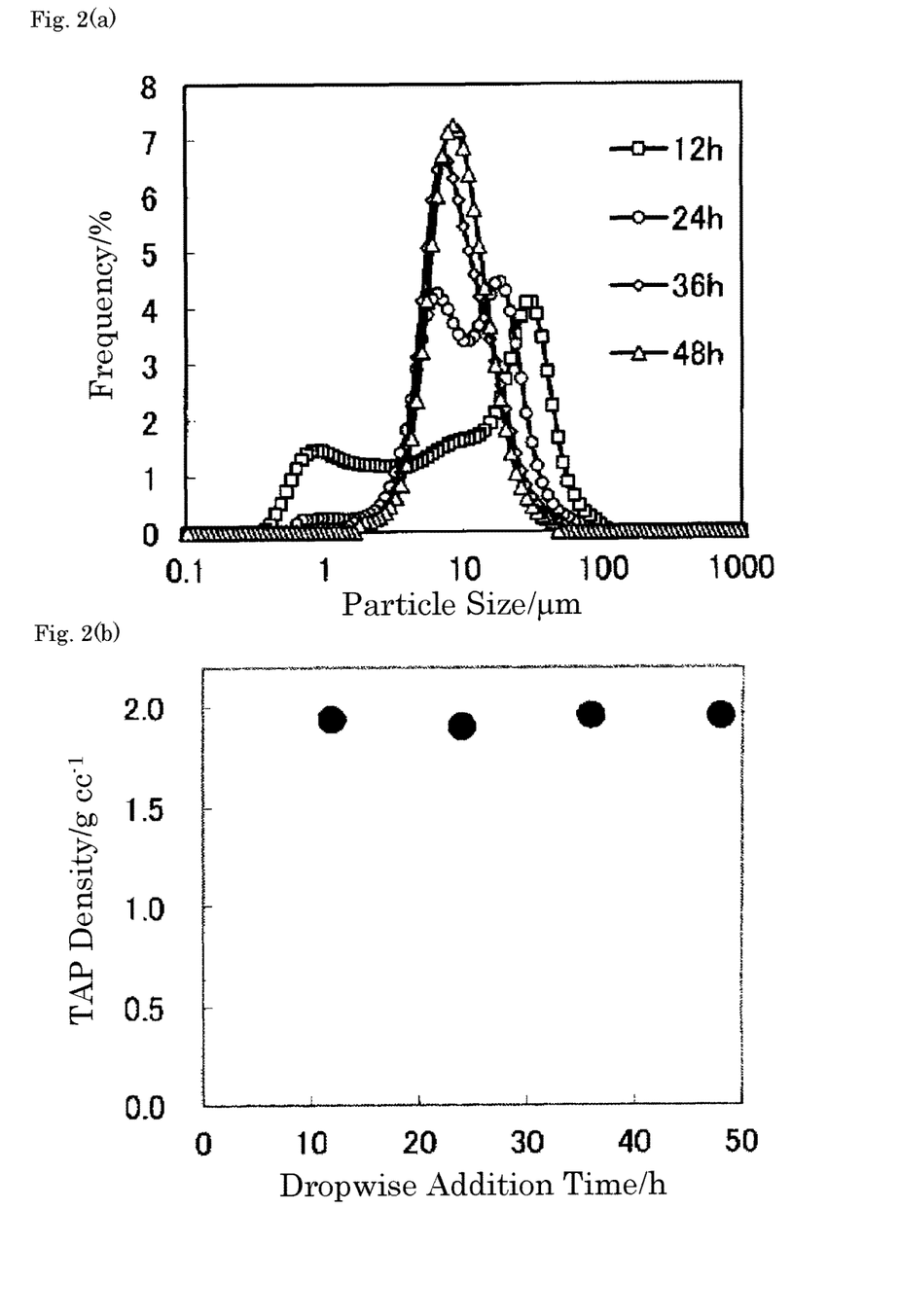
FIG. 2(a) is a view showing a particle size distribution for every dropwise addition time of a sintered lithium transition metal composite oxide.
FIG. 2(b) is a view showing a tap density for every dropwise addition time on a sintered lithium transition metal composite oxide.

In the present invention, it was found that a time during which a solution containing a compound of Ni and Co and a solution containing a Mn compound are added dropwise in the coprecipitated precursor preparation step, has the effect on the particle size distribution of the lithium transition metal composite oxide after sintering. Although as shown in FIG. 1(a), remarkable variations in particle size distribution of the coprecipitated precursor with dropwise addition time are not found, great variations in particle size distribution of the lithium transition metal composite oxide after sintering are found, as shown in FIG. 2(a). When the dropwise addition time is short, the particle size distribution of the lithium transition metal composite oxide has two or more local maximal values, but the particle size distribution of the coprecipitated precursor does not have two or more local maximal values. In order to obtain the lithium transition metal composite oxide in which the particle size distribution does not have two or more local maximal values, the dropwise addition time is preferably set to 30 hours or more, and more preferably 36 to 48 hours.

By using the lithium transition metal composite oxide in which the particle size distribution does not have two or more local maximal values as a positive active material, the initial efficiency of the lithium secondary battery can be improved, as described above.

Figure 1B:
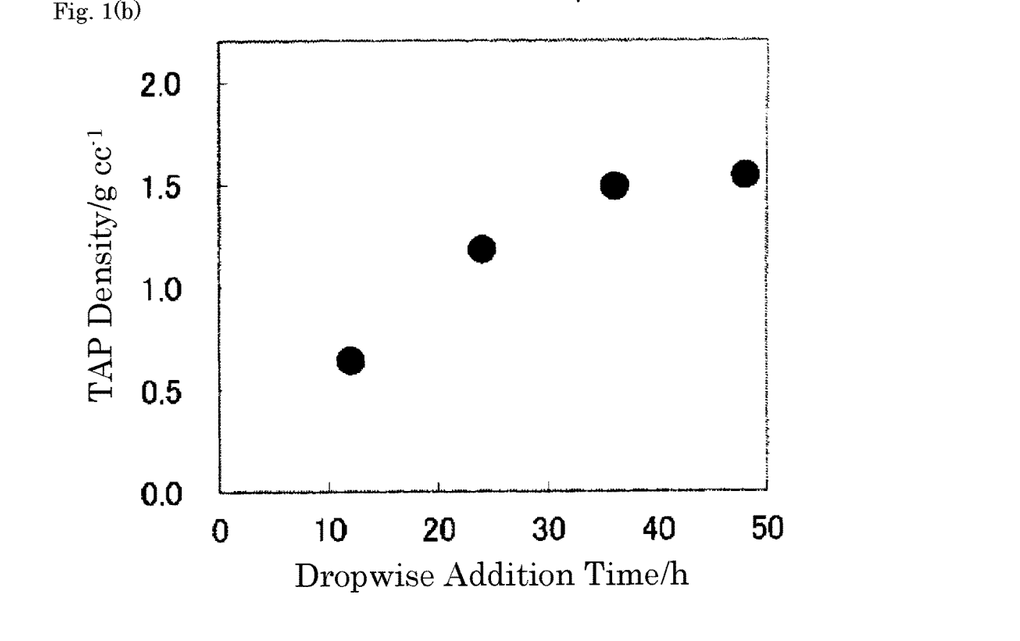
FIG. 1(b) is a view showing a tap density for every dropwise addition time of a coprecipitated precursor.

Further, as shown in FIG. 2(b), variations in tap density of the lithium transition metal composite oxide with dropwise addition time are not found (in Examples, about 1.9 g/cc to 2.0 g/cc), but as shown in FIG. 1(b), remarkable variations in tap density of the coprecipitated precursor with dropwise addition time are found. By lengthening the dropwise addition time, the tap density of the coprecipitated precursor can be increased. In order to attain the tap density of the coprecipitated precursor of 1.4 g/cc or more, the dropwise addition time is preferably set to 30 hours or more, and more preferably 36 to 48 hours.

By producing a lithium transition metal composite oxide using the coprecipitated precursor having a tap density of 1.4 g/cc or more, the initial efficiency of the lithium secondary battery can be improved.

When a complexing agent is present in the reaction tank and a certain convection condition is applied, rotation of particles and revolution in a stirring tank are accelerated by further continuing stirring after completion of dropwise addition of the aqueous solution of a raw material, and in this process, particles grow stepwise in the form of a homocentric sphere while impinging on one another. That is, the coprecipitated precursor is formed by undergoing two-staged reactions of a metal complex formation reaction in adding dropwise the aqueous solution of a raw material to the reaction tank and a precipitate formation reaction occurring while the metal complex remains in the reaction tank. Accordingly, by appropriately selecting a time during which stirring is further continued after completion of dropwise addition of the aqueous solution of a raw material, a coprecipitated precursor having a desired particle size can be obtained.

The stirring duration time after completion of dropwise addition of an aqueous solution of a raw material is preferably 0.5 hr or more, and more preferably 1 hr or more in order to grow particles as uniform spherical particles although a preferred stirring duration time is affected by a size of the reaction tank, stirring conditions, a pH, and a reaction temperature. Further, the stirring duration time is preferably 30 hr or less, more preferably 25 hr or less, and most preferably 20 hr or less in order to reduce a possibility that power performance in a low SOC region of a battery is insufficient because of a too large particle size.

The active material for a lithium secondary battery of the present invention can be suitably prepared by mixing the carbonate precursor and a Li compound, followed by heat-treating the mixture. By using, as the Li compound, lithium hydroxide, lithium carbonate, lithium nitrate, lithium acetate or the like, the active material can be suitably produced. For the amount of the Li compound, however, it is preferred to charge the Li compound in an excessive amount by about 1 to 5% in consideration of elimination of a part thereof during sintering.

The sintering temperature influences the reversible capacity of the active material.

When the sintering temperature is too low, there is such a tendency that crystallization does not adequately proceed and an electrode characteristic is degraded. In the present invention, the sintering temperature is preferably set to 750° C. or higher. By adequate crystallization, resistance at a grain boundary can be reduced and smooth lithium ion transport can be promoted.

Further, the present inventors confirmed by analyzing a half width of a diffraction peak of the active material of the present invention in detail that the strain remains in a lattice in the sample synthesized at a temperature lower than 750° C., and most of the strain can be eliminated by synthesizing the active material at a temperature of 750° C. or higher. Further, a size of a crystallite increased in proportion to a rise of a synthesis temperature. Therefore, in the composition of the active material of the present invention, a good discharge capacity was obtained by aspiring to particles in which there is little lattice distortion in a system and a size of a crystallite adequately grows. Specifically, it was found to be preferred that a synthesis temperature (sintering temperature) and composition as a Li/Me ratio at which an amount of strain to a lattice constant is 2% or less and the size of a crystallite has grown to 50 nm or more, are employed. When such an active material is formed as an electrode and charge-discharge is performed, it is preferred as the effect to be obtained the size of a crystallite is also maintained at 30 nm or more during a charge-discharge process although the size varies due to expansion/contraction.

Meanwhile, when the sintering temperature is too high, a structural change from a layered hexagonal crystal structure to a rock-salt-type cubic structure occurs, and it becomes disadvantageous to Li$^+$ movement in the active material during a charge-discharge reaction, and discharge performance is degraded.

Accordingly, the sintering temperature is preferably set to 750° C. to 900° C. when the lithium transition metal composite oxide represented by the composition formula $Li_{1+x}(Ni_aCo_bMn_c)_{1-x}O_2$ ($-0.1<x<0.1$, $0.5 \le a \le 0.9$, $0.1 \le b \le 0.3$, $0.03 \le c \le 0.3$, $a+b+c=1$) is used as a positive active material in order to improve the energy density or the initial efficiency together with the energy density.

The negative electrode material is not limited, and any material may be selected as long as it can release or absorb lithium ions. Examples thereof include titanium-based materials such as lithium titanate having a spinel-type crystal structure typified by $Li[Li_{1/3}Ti_{5/3}]O_4$, alloy-based materials such as Si-, Sb- and Sn-based alloy materials, lithium metal, lithium alloys (lithium metal-containing alloys such as lithium-silicon, lithium-aluminum, lithium-lead, lithium-tin, lithium-aluminum-tin, lithium-gallium and wood alloys), lithium composite oxides (lithium-titanium) and silicon oxide as well as alloys capable of absorption/release of lithium, and carbon materials (e.g. graphite, hard carbon, low temperature-calcined carbon and amorphous carbon).

A powder of the positive active material and a powder of the negative electrode material preferably have an average particle size of 100 μm or less. Particularly, the powder of the positive active material preferably has an average particle size of 10 μm or less for the purpose of improving a high-power performance of the nonaqueous electrolyte battery. A pulverizer and a classifier are used for obtaining a powder in a predetermined shape. For example, a mortar, a ball mill, a sand mill, a vibration ball mill, a planetary ball mill, a jet mill, a counter jet mill, a swirling air flow jet mill, a sieve or the like is used. At the time of pulverizing, wet crushing can also be used in which water, or an organic solvent such as hexane coexists. The classification method is not particularly limited, and a sieve, an air classifier or the like is used as required in both dry and wet processes.

The positive active material and the negative electrode material which are main components of the positive electrode and the negative electrode have been described in detail above; however, the aforementioned positive electrode and negative electrode may contain, in addition to the aforementioned main components, a conducting additive, a binding agent, a thickener, a filler and the like as other components.

The conducting additive is not limited as long as it is an electron-conductive material that has no adverse effect on battery performance. Normally, the conducting additive may include one of or a mixture of conductive materials such as natural graphite (scaly graphite, flake graphite, earthy graphite, etc.), artificial graphite, carbon black, acetylene black, Ketjen black, carbon whisker, carbon fibers, metal (copper, nickel, aluminum, silver, gold, etc.) powders, metal fibers and conductive ceramic materials.

Among them, acetylene black is preferable as a conducting additive from the viewpoint of electron conductivity and coating properties. The additive amount of the conducting additive is preferably 0.1% by weight to 50% by weight, and particularly preferably 0.5% by weight to 30% by weight with respect to the total weight of the positive electrode or negative electrode. Particularly, use of acetylene black pulverized into ultrafine particles of 0.1 to 0.5 μm is preferable because the required amount of carbon can be reduced. These mixing methods involve physical mixing, the ideal of which is homogeneous mixing. Thus, mixing can be carried out in a dry process or a wet process using a powder mixer such as a V-type mixer, an S-type mixer, a Raikai mixer, a ball mill or a planetary ball mill.

As the binding agent, thermoplastic resins such as polytetrafluoroethylene (PTFE), polyvinylidene fluoride (PVDF), polyethylene and polypropylene, and polymers having rubber elasticity, such as ethylene-propylene-diene terpolymer (EPDM), sulfonated EPDM, styrene-butadiene rubber (SBR) and fluororubber can normally be used alone or as a mixture of two or more thereof. The additive amount of the binding agent is preferably 1 to 50% by weight, and particularly preferably 2 to 30% by weight with respect to the total weight of the positive electrode or negative electrode.

The filler may be any material as long as it has no adverse effect on battery performance. An olefin-based polymer such as polypropylene or polyethylene, amorphous silica, alumina, zeolite, glass, carbon or the like is normally used. The additive amount of the filler is preferably 30% by weight or less with respect to the total amount of the positive electrode or the negative electrode.

The positive electrode and the negative electrode are suitably prepared by kneading the aforementioned main components (positive active material in the positive electrode and negative electrode material in the negative electrode) and other materials to form a composite, and mixing the composite with an organic solvent such as N-methylpyrrolidone or toluene, or water, followed by applying or press-bonding the resulting mixed liquid onto a current collector which is described in detail below, and carrying out a heating treatment at a temperature of about 50° C. to 250° C. for about 2 hours. For the aforementioned coating method, for example, it is preferable to perform coating in any thickness and any shape using means such as roller coating by an applicator roll or the like, screen coating, a doctor blade system, spin coating or a bar coater, but the coating method is not limited thereto.

The nonaqueous electrolyte used in the lithium secondary battery according to the present invention is not limited, and those that are generally proposed to be used in lithium batteries and the like can be used. Examples of the nonaqueous solvent used in the nonaqueous electrolyte may include, but are not limited to, cyclic carbonates such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethylmethyl carbonate; chain esters such as methyl formate, methyl acetate and methyl butyrate; tetrahydrofuran or derivatives thereof, ethers such as 1,3-dioxane, 1,4-dioxane, 1,2-dimethoxyethane, 1,4-dibutoxyethane and methyl diglyme; nitriles such as acetonitrile, benzonitrile; dioxolane or derivatives thereof; and ethylene sulfide, sulfolane, sultone or derivatives thereof alone or mixtures of two or more thereof.

Examples of the electrolyte salt used in the nonaqueous electrolyte include inorganic ion salts having one of lithium (Li), sodium (Na) and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, KSCN, and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate and lithium dodecylbenzenesulfonate, and these ionic compounds can be used singly or in combination of two or more thereof.

Further, by mixing $LiPF_6$ or $LiBF_4$ with a lithium salt having a perfluoroalkyl group, such as $LiN(C_2F_5SO_2)_2$, the viscosity of the electrolyte can be further reduced, and therefore the low-temperature performance can be further improved, and self discharge can be suppressed, thus being more preferable.

Further, an ambient temperature molten salt or an ion liquid may be used as a nonaqueous electrolyte.

The concentration of the electrolyte salt in the nonaqueous electrolyte is preferably 0.1 mol/l to 5 mol/l, and more preferably 0.5 mol/l to 2.5 mol/l for reliably obtaining a nonaqueous electrolyte battery having high battery performance.

As a separator, it is preferred that a porous membrane, a nonwoven fabric or the like, which shows excellent high rate discharge performance, be used singly or in combination. Examples of the material constituting the separator for a nonaqueous electrolyte battery include polyolefin-based resins typified by polyethylene, polypropylene and the like, polyester-based resins typified by polyethylene terephthalate, polybutylene terephthalate and the like, polyvinylidene fluoride, vinylidene fluoride-hexafluoropropylene copolymers, vinylidene fluoride-perfluoro vinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers and vinylidene fluoride-ethylene-tetrafluoroethylene copolymers.

The porosity of the separator is preferably 98% by volume or less from the viewpoint of the strength. The porosity is preferably 20% by volume or more from the viewpoint of charge-discharge performance.

For the separator, for example, a polymer gel formed of a polymer such as acrylonitrile, ethylene oxide, propylene oxide, methyl methacrylate, vinyl acetate, vinyl pyrrolidone or polyvinylidene fluoride, and an electrolyte may be used.

Use of the nonaqueous electrolyte in a gel form as described above is preferred from the viewpoint of being effective at preventing liquid leakage.

Moreover, for the separator, use of the aforementioned porous membrane, nonwoven fabric or the like and the polymer gel in combination is preferable since liquid retainability of the electrolyte is improved. That is, a film in which the surface and the inner surface of the micropores of a polyethylene microporous membrane are coated with a solvophilic polymer having a thickness of several μm or less is formed, and an electrolyte is held within the micropores of the film, so that the solvophilic polymer is formed into a gel.

Examples of the solvophilic polymer include, in addition to polyvinylidene fluoride, polymers in which an acrylate monomer having an ethylene oxide group, an ester group or the like, an epoxy monomer, a monomer having an isocyanate group or the like is crosslinked. The monomer can be subjected to a crosslinking reaction by carrying out heating or using ultraviolet rays (UV) while using a radical initiator at the same time, or using active light rays such as electron beams (EB) or the like.

Other components of a battery includes a terminal, an insulating plate, a battery case and the like, and for these parts, heretofore used parts may be used as-is.

Figure 3:
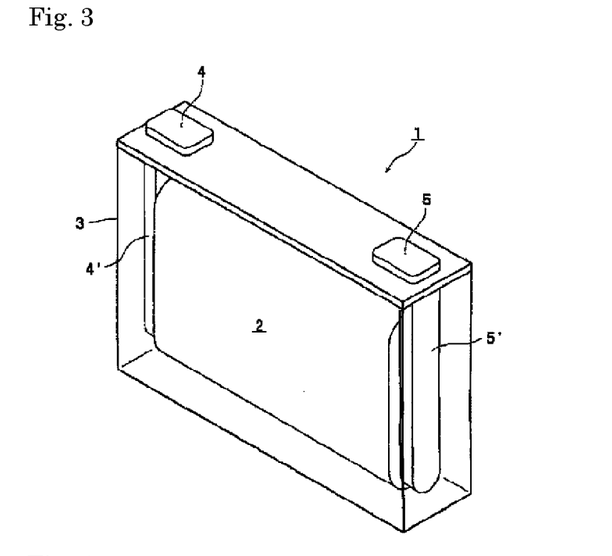
FIG. 3 is a perspective view of an appearance showing an embodiment of a lithium secondary battery of the present invention.

FIG. 3 shows a perspective view of an appearance of a rectangular lithium secondary battery 1 of an embodiment of the lithium secondary battery according to the present invention. Incidentally, FIG. 3 is a perspective view of the inside of a container. In the lithium secondary battery 1 shown in FIG. 3, an electrode group 2 is housed in a battery container 3. The electrode group 2 is configured by winding a positive electrode including a positive active material and a negative electrode including a negative active material with a separator interposed therebetween. The positive electrode is electrically connected to a positive electrode terminal 4 with a positive lead 4' interposed therebetween, and the negative electrode is electrically connected to a negative electrode terminal 5 with a negative lead 5' interposed therebetween.

Figure 4:
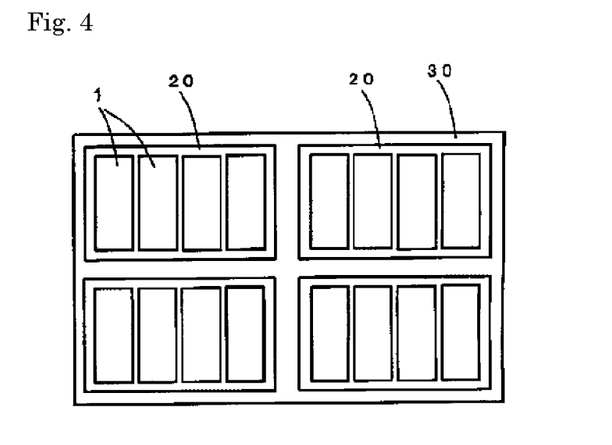
FIG. 4 is a schematic view showing an energy storage apparatus having a plurality of the lithium secondary batteries assembled according to the present invention.

The configuration of the lithium secondary battery according to the present invention is not particularly limited, and examples thereof include a cylindrical battery, a prismatic battery (rectangular battery) and a flat battery. The present invention can also be realized as an energy storage apparatus having a plurality of the lithium secondary batteries assembled. An embodiment of the energy storage apparatus is shown in FIG. 4. In FIG. 4, the energy storage apparatus 30 includes a plurality of energy storage units 20. Each of energy storage units 20 includes a plurality of lithium secondary batteries 1. The energy storage apparatus 30 can be mounted as a power source for automobiles such as electric automobiles (EV), hybrid automobiles (HEV) and plug-in hybrid automobiles (PHEV).

Both the conventional positive active material and the active material of the present invention are capable of charge-discharge at a positive electrode potential of around 4.5 V (vs. $Li/Li^+$). However, depending on the type of a nonaqueous electrolyte used, battery performance may be deteriorated by oxidative decomposition of the nonaqueous electrolyte if the positive electrode potential during charge is too high. Therefore, a lithium secondary battery, with which sufficient energy density is obtained even when such a charge method that the maximum potential of the positive electrode during charge is 4.3 V (vs. $Li/Li^+$) or less is employed at the time of operation, may be required. When the active material of the present invention is used, an energy density higher than that of the conventional positive active material can be obtained even when such a charge method that the maximum potential of the positive electrode during charge is lower than 4.5 V (vs. Li/Li$^+$), for example 4.4 V (vs. Li/Li$^+$) or less or 4.3 V (vs. Li/Li$^+$) or less is employed at the time of operation.

EXAMPLES

Example 1

Nickel sulfate hexahydrate (630.9 g) and cobalt sulfate heptahydrate (168.7 g) were weighed, and totally dissolved in 3 l of ion-exchange water to prepare a 1.0 M aqueous sulfate solution of which the molar ratio of Ni:Co was 80:20. This solution was referred to as a raw solution 1. Meanwhile, nickel sulfate hexahydrate (17.5 g), cobalt sulfate heptahydrate (11.7 g) and manganese sulfate pentahydrate (54.2 g) were weighed, and totally dissolved in 3 l of ion-exchange water to prepare a 0.11 M aqueous sulfate solution of which the molar ratio of Ni:Co:Mn was 20:12.5:67.5. This solution was referred to as a raw solution 2.

In preparation of an active material of Examples, a hydroxide precursor was prepared with use of a reaction crystallization method. First, 2 l of ion exchange-water was poured into a 5 L reaction tank, and an Ar gas was bubbled for 30 min to thereby remove oxygen contained in ion-exchange water. The temperature of the reaction tank was set at 50° C. (±2° C.), and it was set in such a way that convection adequately occurs in the reaction tank while the contents in the reaction tank was stirred at a rotation speed of 1500 rpm using a paddle impeller equipped with a stirring motor. The sulfate raw solutions 1 and 2 were respectively added dropwise to the reaction tank at a rate of 3 ml/min over 48 hours. Here, between the start of dropwise addition and the completion of dropwise addition, a pH of a solution in the reaction tank was controlled so as to be always kept at 11.0 (±0.1) by appropriately adding dropwise a mixed alkaline solution including 2.0 M sodium hydroxide, 0.5 M ammonia and 0.2 M hydrazine, and the total amount of a reaction liquid was always controlled so as not to exceed 2 L by draining a part of the reaction liquid through an overflow of the reaction liquid. After completion of dropwise addition, stirring of the reaction liquid in the reaction tank was further continued for 3 hours. After completion of stirring, the reaction liquid was left standing at room temperature for 12 hours or more.

Next, using a suction filtration apparatus, grains of a hydroxide precursor produced in the reaction tank were separated, and sodium ions adhering to the grains were cleaned and removed with ion-exchange water, and the resulting grains were dried at 80° C. for 20 hours under ordinary pressure in an air atmosphere by using an electric furnace. Thereafter, grains were pulverized for several minutes with use of an automatic mortar made of agate in order to level grain diameters. In this way, a hydroxide precursor was prepared.

Lithium hydroxide hydrate (0.887 g) was added to the hydroxide precursor (1.899 g), and the resulting mixture was adequately mixed with use of an automatic mortar made of agate to prepare a mixed powder of which the molar ratio of Li:(Ni, Co, Mn) was 101:99. The powder was molded at a pressure of 6 MPa using a pellet molding machine to form a pellet having a diameter of 25 mm. The amount of the mixed powder subjected to pellet molding was determined by performing conversion calculation so that the mass as an expected final product would be 2 g. One of the pellets was placed in an alumina boat having a total length of about 100 mm, the boat was placed in a box-type electric furnace (model: AMF 20), a temperature was elevated from ordinary temperature to 750° C. under normal pressure in an air atmosphere over 10 hours, and the pellet was sintered at 750° C. for 4 hours. The box-type electric furnace had an internal dimension of 10 cm (height), 20 cm (width) and 30 cm (depth), and provided with electrically heated wires at intervals of 20 cm in the width direction. After sintering, a switch of the heater was turned off, and the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken out after confirming that the temperature of the furnace was 100° C. or lower, and crushed by an automatic mortar made of agate for several minutes for equalizing the particle size. In this way, a lithium transition metal composite oxide $Li_{1.01}Ni_{0.74}Co_{0.19}Mn_{0.06}O_2$ of Example 1 was prepared.

Example 2

A lithium transition metal composite oxide of Example 2 was prepared in the same manner as in Example 1 except for changing the sintering temperature of the pellet from 750° C. to 800° C.

Example 3

A lithium transition metal composite oxide of Example 3 was prepared in the same manner as in Example 1 except for changing the sintering temperature of the pellet from 750° C. to 900° C.

Example 4

A lithium transition metal composite oxide $Li_{0.95}Ni_{0.79}Co_{0.20}Mn_{0.06}O_2$ of Example 4 was prepared in the same manner as in Example 2 except that in the sintering step, lithium hydroxide hydrate (0.821 g) was added to the hydroxide precursor (1.942 g) and the resulting mixture was mixed to prepare a mixed powder of which the molar ratio of Li:(Ni, Co, Mn) was 95:105.

Example 5

A lithium transition metal composite oxide $Li_{0.98}Ni_{0.76}Co_{0.20}Mn_{0.06}O_2$ of Example 5 was prepared in the same manner as in Example 2 except that in the sintering step, lithium hydroxide hydrate (0.860 g) was added to the hydroxide precursor (1.916 g) and the resulting mixture was mixed to prepare a mixed powder of which the molar ratio of Li:(Ni, Co, Mn) was 98:102.

Example 6

A lithium transition metal composite oxide $Li_{1.05}Ni_{0.71}Co_{0.18}Mn_{0.06}O_2$ of Example 6 was prepared in the same manner as in Example 2 except that in the sintering step, lithium hydroxide hydrate (0.957 g) was added to the hydroxide precursor (1.853 g) and the resulting mixture was mixed to prepare a mixed powder of which the molar ratio of Li:(Ni, Co, Mn) was 105:95.

Example 7

A lithium transition metal composite oxide $Li_{1.01}Ni_{0.78}Co_{0.15}Mn_{0.06}O_2$ of Example 7 was prepared in the same manner as in Example 2 except that in the hydroxide precursor preparation step, nickel sulfate hexahydrate (670.3 g) and cobalt sulfate heptahydrate (126.5 g) were weighed, a 1.0 M aqueous sulfate solution of which the molar ratio of Ni:Co was 85:15 was prepared, and this solution was referred to as a raw solution 1.

Example 8

A lithium transition metal composite oxide $Li_{1.01}Ni_{0.69}Co_{0.24}Mn_{0.06}O_2$ of Example 8 was prepared in the same manner as in Example 2 except that in the hydroxide precursor preparation step, nickel sulfate hexahydrate (591.4 g) and cobalt sulfate heptahydrate (210.8 g) were weighed, a 1.0 M aqueous sulfate solution of which the molar ratio of Ni:Co was 75:25 was prepared, and this solution was referred to as a raw solution 1 and that in the sintering step, lithium hydroxide hydrate (0.894 g) was added to the hydroxide precursor (1.893 g) and the resulting mixture was mixed to prepare a mixed powder of which the molar ratio of Li:(Ni, Co, Mn) was 101:99.

Example 9

A lithium transition metal composite oxide $Li_{1.01}Ni_{0.76}Co_{0.20}Mn_{0.03}O_2$ of Example 9 was prepared in the same manner as in Example 2 except that in the hydroxide precursor preparation step, nickel sulfate hexahydrate (623.0 g) and cobalt sulfate heptahydrate (177.1 g) were weighed, a 1.0 M aqueous sulfate solution of which the molar ratio of Ni:Co was 79:21 was prepared, and this solution was referred to as a raw solution 1, and nickel sulfate hexahydrate (7.9 g), cobalt sulfate heptahydrate (5.3 g) and manganese sulfate pentahydrate (24.4 g) were weighed, a 0.05 M aqueous sulfate solution of which the molar ratio of Ni:Co:Mn was 20:12.5:67.5 was prepared, and this solution was referred to as a raw solution 2.

Example 10

A lithium transition metal composite oxide $Li_{1.03}Ni_{0.67}Co_{0.18}Mn_{0.12}O_2$ of Example 10 was prepared in the same manner as in Example 2 except that in the hydroxide precursor preparation step, nickel sulfate hexahydrate (35.0 g), cobalt sulfate heptahydrate (23.4 g) and manganese sulfate pentahydrate (108.5 g) were weighed, a 0.22 M aqueous sulfate solution of which the molar ratio of Ni:Co:Mn was 20:12.5:67.5 was prepared, and this solution was referred to as a raw solution 2 and that in the sintering step, lithium hydroxide hydrate (0.931 g) was added to the hydroxide precursor (1.871 g) and the resulting mixture was mixed to prepare a mixed powder of which the molar ratio of Li:(Ni, Co, Mn) was 103:97.

Example 11

A lithium transition metal composite oxide of Example 11 was prepared in the same manner as in Example 2 except for adding dropwise the aforementioned sulfate raw solution 1 and sulfate raw solution 2, respectively, to a reaction tank at a rate of 3 ml/min over 36 hours in the hydroxide precursor preparation step.

Example 12

A lithium transition metal composite oxide of Example 12 was prepared in the same manner as in Example 2 except for adding dropwise the aforementioned sulfate raw solution 1 and sulfate raw solution 2, respectively, to a reaction tank at a rate of 3 ml/min over 12 hours in the hydroxide precursor preparation step.

Example 13

A lithium transition metal composite oxide of Example 13 was prepared in the same manner as in Example 2 except for adding dropwise the aforementioned sulfate raw solution 1 and sulfate raw solution 2, respectively, to a reaction tank at a rate of 3 ml/min over 24 hours in the hydroxide precursor preparation step.

Example 14

A lithium transition metal composite oxide $Li_{1.01}Ni_{0.66}Co_{0.30}Mn_{0.03}O_2$ of Example 14 was prepared in the same manner as in Example 2 except that in the hydroxide precursor preparation step, nickel sulfate hexahydrate (544.7 g) and cobalt sulfate heptahydrate (260.8 g) were weighed, a 1.0 M aqueous sulfate solution of which the molar ratio of Ni:Co was 67:30 was prepared and this solution was referred to as a raw solution 1, and manganese sulfate pentahydrate (22.4 g) was weighed, a 0.031 M aqueous sulfate solution was prepared and this solution was referred to as a raw solution 2, and that in the sintering step, lithium hydroxide hydrate (0.899 g) was added to the hydroxide precursor (1.890 g) and the resulting mixture was mixed to prepare a mixed powder of which the molar ratio of Li:(Ni, Co, Mn) was 101:99.

Example 15

A lithium transition metal composite oxide $Li_{1.01}Ni_{0.86}Co_{0.10}Mn_{0.03}O_2$ of Example 15 was prepared in the same manner as in Example 2 except that in the hydroxide precursor preparation step, nickel sulfate hexahydrate (707.3 g) and cobalt sulfate heptahydrate (86.9 g) were weighed, a 1.0 M aqueous sulfate solution of which the molar ratio of Ni:Co was 87:10 was prepared, and this solution was referred to as a raw solution 1 and that in the sintering step, lithium hydroxide hydrate (0.900 g) was added to the hydroxide precursor (1.890 g) and the resulting mixture was mixed to prepare a mixed powder of which the molar ratio of Li:(Ni, Co, Mn) was 101:99.

Example 16

A lithium transition metal composite oxide $Li_{1.06}Ni_{0.66}Co_{0.09}Mn_{0.19}O_2$ of Example 16 was prepared in the same manner as in Example 2 except that in the hydroxide precursor preparation step, nickel sulfate hexahydrate (613.3 g), cobalt sulfate heptahydrate (93.7 g) and manganese sulfate pentahydrate (80.4 g) were weighed, a 1.0 M aqueous sulfate solution of which the molar ratio of Ni:Co:Mn was 70:10:20 was prepared and this solution was referred to as a raw solution 1, and manganese sulfate pentahydrate (79.6 g) was weighed, a 0.11 M aqueous sulfate solution was prepared and this solution was referred to as a raw solution 2, and that in the sintering step, lithium hydroxide hydrate (0.976 g) was added to the hydroxide precursor (1.842 g) and the resulting mixture was mixed to prepare a mixed powder of which the molar ratio of Li:(Ni, Co, Mn) was 106:94.

Example 17

A lithium transition metal composite oxide $Li_{1.09}Ni_{0.55}Co_{0.09}Mn_{0.27}O_2$ of Example 17 was prepared in the same manner as in Example 1 except that in the hydroxide precursor preparation step, nickel sulfate hexahydrate (591.4 g), cobalt sulfate heptahydrate (105.4 g) and manganese sulfate pentahydrate (90.4 g) were weighed, a 1.0 M aqueous sulfate solution of which the molar ratio of Ni:Co:Mn was 60:10:30 was prepared and this solution was referred to as a raw solution 1, and manganese sulfate pentahydrate (180.8 g) was weighed, a 0.25 M aqueous sulfate solution was prepared and this solution was referred to as a raw solution 2, and that in the sintering step, lithium hydroxide hydrate (1.024 g) was added to the hydroxide precursor (1.812 g) and the resulting mixture was mixed to prepare a mixed powder of which the molar ratio of Li:(Ni, Co, Mn) was 109:91, and the sintering temperature of the pellet was changed from 750° C. to 825° C.

Example 18

A lithium transition metal composite oxide $Li_{1.09}Ni_{0.46}Co_{0.18}Mn_{0.27}O_2$ of Example 18 was prepared in the same manner as in Example 1 except that in the hydroxide precursor preparation step, nickel sulfate hexahydrate (492.9 g), cobalt sulfate heptahydrate (210.8 g) and manganese sulfate pentahydrate (90.4 g) were weighed, a 1.0 M aqueous sulfate solution of which the molar ratio of Ni:Co:Mn was 50:20:30 was prepared and this solution was referred to as a raw solution 1, and manganese sulfate pentahydrate (180.8 g) was weighed, a 0.25 M aqueous sulfate solution was prepared and this solution was referred to as a raw solution 2, and that in the sintering step, lithium hydroxide hydrate (1.024 g) was added to the hydroxide precursor (1.813 g) and the resulting mixture was mixed to prepare a mixed powder of which the molar ratio of Li:(Ni, Co, Mn) was 109:91, and the sintering temperature of the pellet was changed from 750° C. to 850° C.

Example 19

A lithium transition metal composite oxide $Li_{1.06}Ni_{0.47}Co_{0.28}Mn_{0.19}O_2$ of Example 19 was prepared in the same manner as in Example 1 except that in the hydroxide precursor preparation step, nickel sulfate hexahydrate (438.1 g), cobalt sulfate heptahydrate (281.1 g) and manganese sulfate pentahydrate (80.4 g) were weighed, a 1.0 M aqueous sulfate solution of which the molar ratio of Ni:Co:Mn was 50:30:20 was prepared and this solution was referred to as a raw solution 1, and manganese sulfate pentahydrate (79.6 g) was weighed, a 0.11 M aqueous sulfate solution was prepared and this solution was referred to as a raw solution 2, and that in the sintering step, lithium hydroxide hydrate (0.976 g) was added to the hydroxide precursor (1.842 g) and the resulting mixture was mixed to prepare a mixed powder of which the molar ratio of Li:(Ni, Co, Mn) was 106:94, and the sintering temperature of the pellet was changed from 750° C. to 850° C.

Example 20

A lithium transition metal composite oxide $Li_{1.03}Ni_{0.58}Co_{0.29}Mn_{0.10}O_2$ of Example 20 was prepared in the same manner as in Example 1 except that in the hydroxide precursor preparation step, nickel sulfate hexahydrate (525.7 g) and cobalt sulfate heptahydrate (281.1 g) were weighed, a 1.0 M aqueous sulfate solution of which the molar ratio of Ni:Co was 60:30 was prepared and this solution was referred to as a raw solution 1, and manganese sulfate pentahydrate (79.6 g) was weighed, a 0.11 M aqueous sulfate solution was prepared and this solution was referred to as a raw solution 2, and that in the sintering step, lithium hydroxide hydrate (0.930 g) was added to the hydroxide precursor (1.871 g) and the resulting mixture was mixed to prepare a mixed powder of which the molar ratio of Li:(Ni, Co, Mn) was 103:97, and the sintering temperature of the pellet was changed from 750° C. to 825° C.

Comparative Example 1

A lithium transition metal composite oxide $Li_{1.01}Ni_{0.74}Co_{0.19}Mn_{0.06}O_2$ of Comparative Example 1 was prepared in the same manner as in Example 2 except that in the hydroxide precursor preparation step, nickel sulfate hexahydrate (786.5 g), cobalt sulfate heptahydrate (218.0 g) and manganese sulfate pentahydrate (57.8 g) were weighed, and totally dissolved in 4 l of ion-exchange water to prepare a 1.0 M aqueous sulfate solution of which the molar ratio of Ni:Co:Mn was 74.6:19.4:6.0, and the aqueous sulfate solution was added dropwise to a reaction tank.

Comparative Example 2

A lithium transition metal composite oxide $Li_{1.01}Ni_{0.74}Co_{0.19}Mn_{0.06}O_2$ of Comparative Example 2 was prepared in the same manner as in Example 2 except that in the hydroxide precursor preparation step, first, the aforementioned sulfate raw solution 1 was added dropwise to a reaction tank at a rate of 3 ml/min, and after completion of the dropwise addition of 2.25 l of the raw solution 1, the sulfate raw solution 2 was put in a container of the raw solution 1 and the resulting mixed solution was added dropwise to the reaction tank at a rate of 2.4 ml/min, and that a pH of a solution in a reaction tank is controlled so as to be always kept at 11.0 (±0.1) by appropriately adding dropwise a mixed alkaline solution including 2.0 M sodium hydroxide, 0.5 M ammonia and 0.2 M hydrazine between the start of dropwise addition of the raw solution 1 and the completion of dropwise addition of the mixed solution of the raw solution 1 and the raw solution 2.

Comparative Example 3

A lithium transition metal composite oxide $Li_{1.01}Ni_{0.74}Co_{0.19}Mn_{0.06}O_2$ of Comparative Example 3 was prepared in the same manner as in Example 2 except that lithium hydroxide hydrate (0.905 g), nickel hydroxide (1.393 g), cobalt hydroxide (0.362 g) and manganese oxyhydroxide (0.107 g) were adequately mixed with use of an automatic mortar made of agate to prepare a mixed powder of which the molar ratio of Li:Ni:Co:Mn was 101:73.9:19.2:5.9 instead of preparing a mixed powder using the hydroxide precursor.

Comparative Example 4

A lithium transition metal composite oxide of Comparative Example 4 was prepared in the same manner as in Example 1 except for changing the sintering temperature of the pellet from 750° C. to 700° C.

Comparative Example 5

A lithium transition metal composite oxide $Li_{0.90}Ni_{0.82}Co_{0.21}Mn_{0.07}O_2$ of Comparative Example 5 was prepared in the same manner as in Example 2 except that lithium hydroxide hydrate (0.758 g) was added to the hydroxide precursor (1.984 g) and the resulting mixture was mixed to prepare a mixed powder of which the molar ratio of Li:(Ni, Co, Mn) was 90:110.

Comparative Example 6

A lithium transition metal composite oxide $Li_{1.10}Ni_{0.67}Co_{0.17}Mn_{0.06}O_2$ of Comparative Example 6 was prepared in the same manner as in Example 2 except that lithium hydroxide hydrate (1.030 g) was added to the hydroxide precursor (1.804 g) and the resulting mixture was mixed to prepare a mixed powder of which the molar ratio of Li:(Ni, Co, Mn) was 110:90.

Comparative Example 7

A lithium transition metal composite oxide $LiNi_{0.8}Co_{0.2}O_2$ of Comparative Example 7 was prepared in the same manner as in Example 2 except that in the hydroxide precursor preparation step, nickel sulfate hexahydrate (842.6 g) and cobalt sulfate heptahydrate (225.3 g) were weighed, and totally dissolved in 4 l of ion-exchange water to prepare a 1.0 M aqueous sulfate solution of which the molar ratio of Ni:Co was 80:20, and the aqueous sulfate solution was added dropwise to a reaction tank.

Comparative Example 8

A lithium transition metal composite oxide $Li_{1.01}Ni_{0.87}Co_{0.06}Mn_{0.06}O_2$ of Comparative Example 8 was prepared in the same manner as in Example 2 except that in the hydroxide precursor preparation step, nickel sulfate hexahydrate (757.0 g) and cobalt sulfate heptahydrate (33.7 g) were weighed, a 1.0 M aqueous sulfate solution of which the molar ratio of Ni:Co was 96:4 was prepared, and this solution was referred to as a raw solution 1.

Comparative Example 9

A lithium transition metal composite oxide $Li_{1.01}Ni_{0.33}Co_{0.33}Mn_{0.33}O_2$ of Comparative Example 9 was prepared in the same manner as in Example 3 except that in the hydroxide precursor preparation step, nickel sulfate hexahydrate (350.5 g), cobalt sulfate heptahydrate (374.8 g) and manganese sulfate pentahydrate (321.5 g) were weighed, and totally dissolved in 4 l of ion-exchange water to prepare a 1.0 M aqueous sulfate solution of which the molar ratio of Ni:Co:Mn was 33:33:33, and the aqueous sulfate solution was added dropwise to a reaction tank.

Comparative Example 10

A lithium transition metal composite oxide $Li_{1.01}Ni_{0.33}Co_{0.33}Mn_{0.33}O_2$ of Comparative Example 10 was prepared in the same manner as in Example 3 except that in the hydroxide precursor preparation step, nickel sulfate hexahydrate (394.3 g) and cobalt sulfate heptahydrate (421.7 g) were weighed, a 1.0 M aqueous sulfate solution of which the molar ratio of Ni:Co was 50:50 was prepared, and this solution was referred to as a raw solution 1, and manganese sulfate pentahydrate (361.6 g) was weighed, a 0.11 M aqueous sulfate solution of which the molar ratio of Ni:Co:Mn was 0:0:100 was prepared, and this solution was referred to as a raw solution 2.

(Measurement of Particle Size)

For the hydroxide precursors and the lithium transition metal composite oxides according to Examples 2 and 11 to 13, particle size distribution measurements were made in accordance with the following conditions and procedure. Microtrac (model: MT 3000) manufactured by Nikkiso Co., Ltd. was used as a measuring apparatus. The measuring apparatus includes an optical stage, a sample supply section and a computer including control software, and a wet cell having a laser light transmission window is placed on the optical stage. With respect to the measurement principle, a wet cell, through which a dispersion with a measurement object sample dispersed in a dispersive solvent is circulated, is irradiated with laser light, and a distribution of scattered light from the measurement sample is converted into a particle size distribution. The dispersion is stored in a sample supply section, and cyclically supplied to the wet cell by a pump. The sample supply section constantly receives ultrasonic vibrations. In this measurement, water was used as a dispersive solvent. Microtrac DHS for Win 98 (MT 3000) was used as measurement control software. For "substance information" set and input in the measuring apparatus, a value of 1.33 was set as the "refractive index" of the solvent, "Transparent" was selected as the "transparency", and "Nonspherical" was selected as the "spherical particle". A "Set Zero" operation is performed prior to measurement of the sample. The "Set Zero" operation is an operation for subtracting effects on subsequent measurements of disturbance factors (glass, stain of the glass wall surface, glass irregularities, etc.) other than scattered light from particles, wherein only water as a dispersive solvent is fed in a sample supply section, a background operation is performed with only water as a dispersive solvent being circulated through a wet cell, and background data is stored in a computer. Subsequently, a "Sample LD (Sample Loading)" operation is performed. The Sample LD operation is an operation for optimizing the concentration of a sample in a dispersion that is cyclically supplied to a wet cell during measurement, wherein a measurement object sample is manually introduced into a sample supply section in accordance with instructions of measurement control software until an optimum amount is reached. Subsequently, a "measurement" button is depressed, so that a measurement operation is performed. The measurement operation is repeated twice and as an average thereof, a measurement result is output from a computer. The measurement result is acquired as a particle size distribution histogram, and the values of D10, D50 and D90 (D10, D50 and D90 are particle sizes at which the cumulative volume in the particle size distribution of secondary particles is 10%, 50% and 90%, respectively).

The particle size distribution for every dropwise addition time on the coprecipitated hydroxide precursor according to Examples 2 and 11 to 13, is shown in FIG. 1(a). The particle size distribution for every dropwise addition time on the sintered lithium transition metal composite oxide according to Examples 2 and 11 to 13, is shown in FIG. 2(a), and measurement results of D10, D50 and D90 are shown in Table 2.

Further, in the lithium transition metal composite oxides of all of Examples and Comparative Examples, the composite oxide in which the particle size distribution does not have two or more local maximal values is rated as a symbol "○" and the composite oxide in which the particle size distribution has two or more local maximal values is rated as a symbol "x", and these results are shown in Table 1.

(Measurement of Tap Density)

Using a tapping apparatus (made in 1968) manufactured by REI ELECTRIC CO., LTD., the tap densities of the coprecipitated hydroxide precursors and the lithium transition metal composite oxides according to Examples 2 and 11 to 13 were determined as a value obtained by dividing an active material volume after counted 300 times by a mass of the active material. In measurement, 2 g±0.2 g of the active material was charged into a $10^{-2}$ $dm^3$ measuring cylinder.

The tap density for every dropwise addition time on the coprecipitated hydroxide precursor according to Examples 2 and 11 to 13, is shown in FIG. 1(b). The tap density for every dropwise addition time on the sintered lithium transition metal composite oxide according to Examples 2 and 11 to 13, is shown in FIG. 2(b).

(Preparation and Evaluation of Lithium Secondary Battery)

A lithium secondary battery was prepared in accordance with the following procedure using each of the lithium transition metal composite oxides according to Examples 1 to 20 and Comparative Examples 1 to 10 as a positive active material for a lithium secondary battery, and battery performance thereof were evaluated.

An applying paste was prepared in which the active material, acetylene black (AB) and polyvinylidene fluoride (PVdF) were kneaded in a mass ratio of 90:5:5 and dispersed with N-methylpyrrolidone as a dispersion medium. The applying paste was applied onto one surface of an aluminum foil current collector having a thickness of 20 μm to prepare a positive electrode plate. The mass and coating thickness of the active material applied per fixed area was equalized so that test conditions were the same among the lithium secondary batteries of all Examples and Comparative Examples.

For the purpose of accurately observing the independent behavior of a positive electrode, metallic lithium was brought into close contact with a nickel foil current collector and used for a counter electrode, i.e. a negative electrode. Here, a sufficient amount of metallic lithium was placed on the negative electrode so that the capacity of the lithium secondary battery was not limited by the negative electrode.

As an electrolyte solution, a solution obtained by dissolving $LiPF_6$, so as to be 1 mol/l in concentration, in a mixed solvent of ethylene carbonate (EC)/ethylmethyl carbonate (EMC)/dimethyl carbonate (DMC) in a volume ratio of 6:7:7, was used. As a separator, a microporous membrane made of polypropylene, the surface of which was modified with polyacrylate, was used. As a casing body, a metal resin composite film made of polyethylene terephthalate (15 μm)/aluminum foil (50 μm)/metal-adhesive polypropylene film (50 μm) was used. The electrode was housed such that the open ends of a positive electrode terminal and a negative electrode terminal were externally exposed. Fusion margins with the inner surfaces of the aforementioned metal resin composite films facing each other were airtightly sealed except a portion forming an electrolyte solution filling hole, and the electrolyte solution was injected, followed by sealing the electrolyte solution filling hole.

The lithium secondary battery prepared in the procedure described above was subjected to an initial charge-discharge step at 25° C. Charge was constant current-constant voltage charge with a current of 0.1 CmA and a voltage of 4.6 V, and the condition of the end-of-charge was set at a time point at which the current value is reduced to one-sixth. Discharge was constant current discharge with a current of 0.1 CmA and an end voltage of 2.0 V. This charge-discharge cycle was carried out 2 times. Here, a rest step of 30 minutes was provided each after charge and after discharge.

(Measurement of Half Width)

For each of the lithium transition metal composite oxide according to Examples 1 to 20 and Comparative Examples 1 to 10, the half width was determined using an X-ray diffractometer (manufactured by Rigaku Corporation, Model: MiniFlex II). Incidentally, in the present specification, measurement of the half width is made according to the following conditions and procedure.

The radiation source was CuKα, and the acceleration voltage and current were 30 kV and 15 mA, respectively. A sampling width was 0.01 degree, a scanning time was 14 minutes (scanning speed: 5.0), a divergence slit width was 0.625 degree, a light receiving slit width was open, and a scattering slit was 8.0 mm. With respect to the obtained X-ray diffraction data, using "PDXL", attached software of the X-ray diffractometer, the half width F(003) of the diffraction peak present at 2θ=18.6°±1° on an X-ray diffraction chart which is indexed to a (003) plane in the space group R3-m, was determined, and the half width F(104) of the diffraction peak present at 2θ=44°±1° on an X-ray diffraction chart which is indexed to a (104) plane, was determined without removing a peak derived from Kα2.

The ratio of F(003)/F(104) at the end of charge to F(003)/F(104) at the end of discharge was determined in the following manner. On the batteries subjected to the aforementioned initial charge-discharge step, a charge voltage was set to 4.3 V, constant current charge was performed at a current of 0.1 CmA, constant voltage charge was performed until a current value was reduced to 0.01 CmA to bring the battery into the end of charge. Further, on another batteries subjected to the aforementioned initial charge-discharge step, a charge voltage was set to 4.3 V, constant current charge was performed at a current of 0.1 CmA, and after 30 minutes of rest, constant current discharge was performed at a current of 0.1 CmA until a voltage reached 2.0 V to bring the battery into the end of discharge. These batteries were disassembled, followed by taking out a positive electrode plate, the positive electrode plate was adequately washed with dimethyl carbonate and after drying of a whole day and night at room temperature, a composite was taken out of the electrode, and an agglomerated powder was loosened by using an agate mortar. The resulting composite powder was subjected to aforementioned X-ray measurement. A value obtained by dividing a value of a half width ratio F(003)/F(104) which is a ratio of a half width F(003) to a half width F(104) determined from an X-ray diffraction chart obtained on the composite powder extracted from a battery brought into the end of charge by a value of a half width ratio F(003)/F(104) determined from an X-ray diffraction chart obtained on the composite powder extracted from a battery brought into the end of discharge, was considered as a ratio of F(003)/F(104) at the end of charge to F(003)/F(104) at the end of discharge.

Further, it was confirmed that the lithium transition metal composite oxides of all of Examples and Comparative Examples have a hexagonal crystal structure.

In the present specification, the electrode is adjusted to a state of the end of discharge and a state of the end of charge following the aforementioned procedure. However, in Examples described, after the battery in which the metallic lithium electrode was used in the negative electrode was brought into the end of discharge or the end of charge, the battery was disassembled, followed by taking out an electrode, but the battery may be brought into the end of discharge and the end of charge following the aforementioned procedure after the battery is disassembled, followed by taking out an electrode and then the battery in which the metallic lithium electrode is used in the counter electrode is assembled.

(Measurement of Energy Density)

On the aforementioned batteries subjected to the initial charge-discharge step, subsequently, a charge voltage was set to 4.3 V, charge was performed at a current of 0.1 CmA, and after 30 minutes of rest, discharge was performed at a current of 1 CmA under the condition of an end voltage of 2.0 V. In a discharge curve obtained at this time, an area of a portion surrounded by a vertical axis (potential) and a horizontal axis (capacity) was calculated as energy density.

Test results of lithium secondary battery using, as a positive active material, each of the lithium transition metal composite oxides according to Examples 1 to 20 and Comparative Examples 1 to 10, are shown in Table 1.

TABLE 1

| | Lithium Excess Rate | Ni Ratio | Co Ratio | Mn Ratio | Production Method of Coprecipitation | Dropwise Addition Time [hr] | Sintering Temperature [° C.] |
|---|---|---|---|---|---|---|---|
| Example 1 | 0.01 | 0.75 | 0.19 | 0.06 | Added dropwise separately | 48 | 750 |
| Example 2 | 0.01 | 0.75 | 0.19 | 0.06 | Added dropwise separately | 48 | 800 |
| Example 3 | 0.01 | 0.75 | 0.19 | 0.06 | Added dropwise separately | 48 | 900 |
| Example 4 | −0.05 | 0.75 | 0.19 | 0.06 | Added dropwise separately | 48 | 800 |
| Example 5 | −0.02 | 0.74 | 0.2 | 0.06 | Added dropwise separately | 48 | 800 |
| Example 6 | 0.05 | 0.75 | 0.19 | 0.06 | Added dropwise separately | 48 | 800 |
| Example 7 | 0.01 | 0.79 | 0.15 | 0.06 | Added dropwise separately | 48 | 800 |
| Example 8 | 0.01 | 0.70 | 0.24 | 0.06 | Added dropwise separately | 48 | 800 |
| Example 9 | 0.01 | 0.77 | 0.20 | 0.03 | Added dropwise separately | 48 | 800 |
| Example 10 | 0.03 | 0.69 | 0.19 | 0.12 | Added dropwise separately | 48 | 800 |
| Example 11 | 0.01 | 0.75 | 0.19 | 0.06 | Added dropwise separately | 36 | 800 |
| Example 12 | 0.01 | 0.75 | 0.19 | 0.06 | Added dropwise separately | 24 | 800 |
| Example 13 | 0.01 | 0.75 | 0.19 | 0.06 | Added dropwise separately | 12 | 800 |
| Example 14 | 0.01 | 0.67 | 0.3 | 0.03 | Added dropwise separately | 48 | 800 |
| Example 15 | 0.01 | 0.87 | 0.1 | 0.03 | Added dropwise separately | 48 | 800 |
| Example 16 | 0.06 | 0.7 | 0.1 | 0.2 | Added dropwise separately | 48 | 800 |
| Example 17 | 0.09 | 0.6 | 0.1 | 0.3 | Added dropwise separately | 48 | 825 |
| Example 18 | 0.09 | 0.5 | 0.2 | 0.3 | Added dropwise separately | 48 | 850 |
| Example 19 | 0.06 | 0.5 | 0.3 | 0.2 | Added dropwise separately | 48 | 850 |
| Example 20 | 0.03 | 0.6 | 0.3 | 0.1 | Added dropwise separately | 48 | 825 |
| Comparative Example 1 | 0.01 | 0.75 | 0.19 | 0.06 | Uniform raw solution | 48 | 800 |
| Comparative Example 2 | 0.01 | 0.75 | 0.19 | 0.06 | Concentration gradient | 48 | 800 |
| Comparative Example 3 | 0.01 | 0.75 | 0.19 | 0.06 | Synthesis of a solid-phase method | — | 800 |
| Comparative Example 4 | 0.01 | 0.75 | 0.19 | 0.06 | Added dropwise separately | 48 | 700 |
| Comparative Example 5 | −0.1 | 0.75 | 0.19 | 0.06 | Added dropwise separately | 48 | 800 |
| Comparative Example 6 | 0.1 | 0.74 | 0.19 | 0.07 | Added dropwise separately | 48 | 800 |
| Comparative Example 7 | 0 | 0.8 | 0.2 | 0 | — | 48 | 800 |
| Comparative Example 8 | 0.01 | 0.88 | 0.06 | 0.06 | Added dropwise separately | 48 | 800 |
| Comparative Example 9 | 0.01 | 0.33 | 0.33 | 0.33 | Uniform raw solution | 48 | 900 |
| Comparative Example 10 | 0.01 | 0.33 | 0.33 | 0.33 | Added drop wise separately | 48 | 900 |

| | Half Width Ratio at 4.3 V (vs. Li/Li$^+$) $F_{(003)}/F_{(104)}$ | Half Width Ratio at 2.0 V (vs. Li/Li$^+$) $F_{(003)}/F_{(104)}$ | Ratio of $F_{(003)}/F_{(104)}$ at the End of Charge to $F_{(003)}/F_{(104)}$ at the End of Discharge | Particle Size Distribution | Energy Density in Discharging at 1C [mWh/g] | Initial Efficiency [%] |
|---|---|---|---|---|---|---|
| Example 1 | 0.82 | 0.90 | 0.91 | ○ | 706 | 91 |
| Example 2 | 0.99 | 1.04 | 0.95 | ○ | 715 | 92 |
| Example 3 | 0.85 | 0.94 | 0.90 | ○ | 710 | 92 |
| Example 4 | 0.97 | 1.08 | 0.90 | ○ | 705 | 90 |
| Example 5 | 0.94 | 0.93 | 1.01 | ○ | 708 | 90 |
| Example 6 | 0.88 | 0.83 | 1.06 | ○ | 713 | 91 |
| Example 7 | 0.92 | 0.99 | 0.93 | ○ | 702 | 92 |
| Example 8 | 0.84 | 0.78 | 1.08 | ○ | 704 | 92 |
| Example 9 | 0.93 | 0.85 | 1.10 | ○ | 703 | 92 |
| Example 10 | 0.86 | 0.92 | 0.94 | ○ | 709 | 92 |
| Example 11 | 0.99 | 1.04 | 0.95 | ○ | 711 | 92 |
| Example 12 | 0.99 | 1.04 | 0.95 | x | 705 | 86 |
| Example 13 | 0.99 | 1.04 | 0.95 | x | 708 | 86 |
| Example 14 | 0.85 | 0.92 | 0.92 | ○ | 704 | 91 |
| Example 15 | 0.87 | 0.9 | 0.97 | ○ | 709 | 92 |
| Example 16 | 0.86 | 0.95 | 0.91 | ○ | 705 | 91 |
| Example 17 | 0.88 | 0.97 | 0.91 | ○ | 702 | 90 |

TABLE 1-continued

| | | | | | | |
|---|---|---|---|---|---|---|
| Example 18 | 0.89 | 0.99 | 0.90 | ○ | 701 | 90 |
| Example 19 | 0.88 | 0.97 | 0.91 | ○ | 700 | 90 |
| Example 20 | 0.87 | 0.96 | 0.91 | ○ | 702 | 90 |
| Comparative Example 1 | 0.85 | 1.14 | 0.74 | ○ | 658 | 90 |
| Comparative Example 2 | 0.92 | 1.03 | 0.89 | ○ | 674 | 92 |
| Comparative Example 3 | 0.87 | 0.78 | 1.12 | ○ | 578 | 82 |
| Comparative Example 4 | 0.85 | 0.77 | 1.11 | ○ | 645 | 90 |
| Comparative Example 5 | 0.90 | 1.03 | 0.87 | ○ | 563 | 91 |
| Comparative Example 6 | 0.93 | 0.82 | 1.14 | ○ | 670 | 90 |
| Comparative Example 7 | 0.91 | 1.11 | 0.82 | ○ | 657 | 92 |
| Comparative Example 8 | 0.85 | 0.99 | 0.86 | ○ | 662 | 92 |
| Comparative Example 9 | 0.92 | 1.12 | 0.82 | ○ | 544 | 92 |
| Comparative Example 10 | 0.92 | 1.05 | 0.88 | ○ | 502 | 92 |

| | Lithium Excess Rate | Ni Ratio | Co Ratio | Mn Ratio | Dropwise Addition Time [hr] | Particle Size Distribution D10 [μm] | Particle Size Distribution D50 [μm] | Particle Size Distribution D90 [μm] | Energy Density in Discharging at 1C [mWh/g] | Initial Efficiency [%] |
|---|---|---|---|---|---|---|---|---|---|---|
| Example 2 | 0.01 | 0.75 | 0.19 | 0.06 | 48 | 4.8 | 8.7 | 16.8 | 715 | 92 |
| Example 11 | 0.01 | 0.75 | 0.19 | 0.06 | 36 | 4.5 | 8.2 | 18.3 | 711 | 92 |
| Example 12 | 0.01 | 0.75 | 0.19 | 0.06 | 24 | 3.9 | 10.1 | 24.5 | 705 | 86 |
| Example 13 | 0.01 | 0.75 | 0.19 | 0.06 | 12 | 0.9 | 11.9 | 38.2 | 708 | 86 |

It is found from Table 1 that as shown in Examples 1 to 20, a lithium secondary battery having high energy density is attained when using, as a positive active material, a lithium transition metal composite oxide in which a transition metal (Me) includes Ni, Co and Mn, a molar ratio of Ni to the transition metal (Me) is 0.5 or more and 0.9 or less, a molar ratio of Co to the transition metal (Me) is 0.1 or more and 0.3 or less, a molar ratio of Mn to the transition metal (Me) is 0.03 or more and 0.3 or less, and a ratio of F(003)/F(104) at the end of charge to F(003)/F(104) at the end of discharge is 0.9 or more and 1.1 or less.

The lithium transition metal composite oxide of Examples is represented by the composition formula of $Li_{1+x}(Ni_aCo_bMn_c)_{1-x}O_2$, and the ratio of F(003)/F(104) at the end of charge to F(003)/F(104) at the end of discharge is less than 0.9 when x is −0.1 or less, as shown in Comparative Example 5, and the ratio of F(003)/F(104) at the end of charge to F(003)/F(104) at the end of discharge is more than 1.1 when x is 0.1 or more, as shown in Comparative Example 6, and the energy density is reduced in both cases.

By separately and simultaneously adding dropwise a solution containing a compound of Ni and Co and a solution containing a Mn compound in the precursor preparation step, as shown in Examples 1 to 20, a lithium transition metal composite oxide in which the ratio of F(003)/F(104) at the end of charge to F(003)/F(104) at the end of discharge is 0.9 or more and 1.1 or less, is obtained, and the energy density is increased. In contrast with this, the ratio of F(003)/F(104) at the end of charge to F(003)/F(104) at the end of discharge is less than 0.9 and the energy density is reduced when as shown in Comparative Example 1, a uniform raw solution containing a compound of Ni, Co and Mn is used, when as shown in Comparative Example 2, dropwise addition of the solution containing a compound of Ni and Co and dropwise addition of the solution containing a Mn compound are not simultaneous, and Mn has a concentration gradient, when as shown in Comparative Example 7, a Mn compound is not contained, and when containing low amount of a compound of Co as shown in Comparative Example 8. Further, the ratio of F(003)/F(104) at the end of charge to F(003)/F(104) at the end of discharge is more than 1.1 and the energy density is reduced when as shown in Comparative Example 3, the lithium transition metal composite oxide having the same composition as that of the present invention is synthesized by the solid phase method, and when as shown in Comparative Example 4, the sintering temperature of the lithium transition metal composite oxide is low. In the case of the precursor having the same composition as that of a conventional precursor which has a smaller Ni content and a larger content of a Mn compound than that of the present invention as shown in Comparative Examples 9 and 10, the ratio of F(003)/F(104) at the end of charge to F(003)/F(104) at the end of discharge is less than 0.9 and the energy density is reduced even though a uniform raw solution is used like Comparative Example 9, or the solutions are separately added dropwise like Comparative Example 10.

From Tables 1 and 2 and FIG. 2(a), it is found that a time during which a solution containing a compound of Ni and Co and a solution containing a Mn compound are added dropwise in the coprecipitated precursor preparation step, has the effect on the particle size distribution of the lithium transition metal composite oxide after sintering. In Examples 1 to 11 and 14 to 20 in which the dropwise addition time is 36 hours or more, a lithium transition metal composite oxide in which the particle size distribution does not have two or more local maximal values is obtained, and in a lithium secondary battery using the composite oxide as a positive active material, the energy density is increased and the initial efficiency is improved. In contrast with this, in Examples 12 and 13 in which the dropwise addition time is 24 hours or less, the particle size distribution of a lithium transition metal composite oxide has two or more local maximal values, and in a lithium secondary battery using the composite oxide as a positive active material, the energy density is high but the initial efficiency is lowered.

Further, as shown in FIG. 2(b), in Examples 2, and 11 to 13, the tap densities of the lithium transition metal composite oxide are about 1.9 g/cc to 2.0 g/cc and variations in tap density are not found. As shown in FIG. 1(b), however, the tap density of the coprecipitated precursor is increased by lengthening the dropwise addition time, and in Examples 2 and 11 in which the dropwise addition time is 36 hours or more, the tap density of the coprecipitated precursor becomes 1.4 g/cc or more. By using, as a positive active material, a lithium transition metal composite oxide obtained by sintering the coprecipitated precursor having a tap density of 1.4 g/cc or more, a lithium secondary battery having high energy density and excellent initial efficiency is obtained.

DESCRIPTION OF REFERENCE SIGNS

1 Lithium secondary battery
2 Electrode group
3 Battery container
4 Positive electrode terminal
4' Positive lead
5 Negative electrode terminal
5' Negative lead
20 Energy storage unit
30 Energy storage apparatus

INDUSTRIAL APPLICABILITY

When the positive active material containing a novel lithium transition metal composite oxide of the present invention is used, since a lithium secondary battery which has high energy density, or has high energy density and excellent initial efficiency can be provided, the lithium secondary battery is useful as a lithium secondary battery for hybrid automobiles and electric automobiles.

The invention claimed is:

1. A positive active material for a lithium secondary battery containing a lithium transition metal composite oxide having a hexagonal crystal structure in which the transition metal (Me) includes Ni, Co and Mn, wherein in the lithium transition metal composite oxide, a molar ratio of Ni to the transition metal (Me) (Ni/Me) is 0.5 or more and 0.9 or less, a molar ratio of Co to the transition metal (Me) (Co/Me) is 0.1 or more and 0.3 or less, a molar ratio of Mn to the transition metal (Me) (Mn/Me) is 0.03 or more and 0.3 or less, and a value obtained by dividing a half width ratio F(003)/F(104) at a potential of 4.3 V (vs. Li/Li$^+$) by a half width ratio F(003)/F(104) at a potential of 2.0 V (vs. Li/Li+) is 0.9 or more and 1.1 or less.

2. The positive active material for a lithium secondary battery according to claim 1, wherein the lithium transition metal composite oxide is represented by the composition formula Li$_{1+x}$(Ni$_a$Co$_b$Mn$_c$)$_{1-x}$O$_2$ (−0.1<x<0.1, 0.5≤a≤0.9, 0.1≤b≤0.3, 0.03≤c≤0.3, a+b+c=1).

3. The positive active material for a lithium secondary battery according to claim 1, wherein in the lithium transition metal composite oxide, a particle size distribution does not have two or more local maximal values.

4. A method for producing the positive active material of claim 1 for a lithium secondary battery containing the lithium transition metal composite oxide having the hexaqonal crystal structure in which the transition metal (Me) includes Ni. Co and Mn, wherein when coprecipitating compounds containing Ni, Co and Mn in a solution to prepare a precursor, a solution containing a compound of Ni and Co and a solution containing a Mn compound are simultaneously added dropwise separately, and thereby a precursor of a transition metal composite oxide in which a molar ratio of Ni to the transition metal (Me) is 0.5 or more and 0.9 or less, a molar ratio of Co to the transition metal (Me) is 0.1 or more and 0.3 or less, and a molar ratio of Mn to the transition metal (Me) is 0.03 or more and 0.3 or less, is prepared.

5. The method for producing the positive active material for a lithium secondary battery according to claim 4, wherein the precursor has a tap density of 1.4 g/cc or more.

6. An electrode for a lithium secondary battery containing the positive active material for a lithium secondary battery according to claim 1.

7. A lithium secondary battery including the electrode for a lithium secondary battery according to claim 6.

8. An energy storage apparatus configured by assembling a plurality of the lithium secondary batteries according to claim 7.

* * * * *